(12) United States Patent
Mori et al.

(10) Patent No.: US 12,494,235 B2
(45) Date of Patent: Dec. 9, 2025

(54) SYSTEMS AND METHODS FOR FLEXIBLE BANK ADDRESSING IN DIGITAL COMPUTING-IN-MEMORY (DCIM)

(71) Applicant: Taiwan Semiconductor Manufacturing Company, Ltd., Hsinchu (TW)

(72) Inventors: Haruki Mori, Hsinchu (TW); Hidehiro Fujiwara, Hsinchu (TW); Wei-Chang Zhao, Hsinchu (TW); Kinshuk Khare, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 171 days.

(21) Appl. No.: 18/469,742

(22) Filed: Sep. 19, 2023

(65) Prior Publication Data
US 2024/0331745 A1 Oct. 3, 2024

Related U.S. Application Data

(60) Provisional application No. 63/493,379, filed on Mar. 31, 2023.

(51) Int. Cl.
*G11C 7/00* (2006.01)
*G06F 7/544* (2006.01)
*G11C 7/10* (2006.01)

(52) U.S. Cl.
CPC .......... *G11C 7/1069* (2013.01); *G06F 7/5443* (2013.01); *G11C 7/1066* (2013.01); *G11C 7/1096* (2013.01)

(58) Field of Classification Search
CPC ............. G06F 11/0772; G06F 11/1428; G06F 12/0238; G06F 12/0607; G06F 12/0806;
(Continued)

(56) References Cited

U.S. PATENT DOCUMENTS 6,378,032 B1 * 4/2002 Robertson ........... G06F 12/0607
365/230.03

FOREIGN PATENT DOCUMENTS

CN  113467751 A  10/2021
TW  201017529 A  5/2010

OTHER PUBLICATIONS

Office Action issued in Taiwan Appl. No. 113100957 dated May 23, 2025.

* cited by examiner

*Primary Examiner* — Thong Q Le
(74) *Attorney, Agent, or Firm* — FOLEY & LARDNER LLP

(57) ABSTRACT

A method for flexible bank addressing in digital computing-in-memory (DCIM). The method includes providing bank groups, each of the bank groups comprising a respective number of memory banks, each memory bank configured to store a corresponding portion of input feature map data. The method includes reading, during a first clock cycle, a first portion of the input feature map data from a first one of the bank groups and a second portion of the input feature map data from a second one of the bank groups. The method includes performing a first multiply-accumulate operation using the first portion and the second portion. The method includes reading, during a second clock cycle, a third portion of the input feature map data from the first bank group. The method includes performing a second multiply-accumulate operation using the second portion and the third portion.

20 Claims, 36 Drawing Sheets

(58) Field of Classification Search
CPC .............. G06F 12/0831; G06F 12/0842; G06F 12/0851; G06F 12/0862; G06F 12/0897; G06F 12/1045; G06F 12/1054; G06F 12/1063; G06F 13/1631; G06F 13/1678; G06F 13/1684; G06F 13/385; G06F 3/0611; G06F 3/0653; G11C 5/04; G11C 8/12; G11C 11/161; G11C 11/1653; G11C 11/1673; G11C 11/1675; G11C 11/1693; G11C 29/52; G11C 11/15; G11C 11/165; G11C 11/1659; G11C 11/40618; G11C 29/028; G11C 7/22; G11C 11/4082; G11C 11/4087; G11C 29/44; G11C 5/025; G11C 8/00; G11C 11/40; G11C 11/40603; G11C 11/40611; G11C 11/40622; G11C 11/54; G11C 29/023; G11C 29/24; G11C 29/42; G11C 29/50016; G11C 7/10; G11C 7/1006; G11C 7/1045; G11C 7/1066; G11C 7/1069; G11C 7/1072; G11C 7/1096; G11C 11/406; G11C 16/10; G11C 16/26; G11C 29/022; G11C 29/38; G11C 7/1027; G11C 11/16; G11C 11/1697; G11C 11/408; G11C 11/4091; G11C 11/4093; G11C 11/4096; G11C 11/5607; G11C 13/047; G11C 2029/0409; G11C 29/18; G11C 29/50008; G11C 29/56004; G11C 29/56012; G11C 29/846; G11C 7/06; G11C 7/1009; G11C 7/1054; G11C 7/1057; G11C 7/1081; G11C 7/12; G11C 7/222

See application file for complete search history.

| | Row address | SEL[0] =1b'0 | | | SEL[1] =1b'0 | | | SEL[2] =1b'0 | | |
|---|---|---|---|---|---|---|---|---|---|---|
| n th CIM | Row0 | F0 | F1 | F2 | F3 | F4 | F5 | F6 | F7 | F8 |
| | Row1 | F9 | F10 | F11 | F12 | F13 | F14 | F15 | F16 | F17 |
| | Row address | SEL[0] =1b'1 | | | SEL[1] =1b'0 | | | SEL[2] =1b'0 | | |
| n+1 th CIM | Row0 | F0 | F1 | F2 | F3 | F4 | F5 | F6 | F7 | F8 |
| | Row1 | F9 | F10 | F11 | F12 | F13 | F14 | F15 | F16 | F17 |
| | Row address | SEL[0] =1b'1 | | | SEL[1] =1b'1 | | | SEL[2] =1b'0 | | |
| n+2 th CIM | Row0 | F18 | F1 | F2 | F3 | F4 | F5 | F6 | F7 | F8 |
| | Row1 | F9 | F10 | F11 | F12 | F13 | F14 | F15 | F16 | F17 |

SYSTEMS AND METHODS FOR FLEXIBLE BANK ADDRESSING IN DIGITAL COMPUTING-IN-MEMORY (DCIM)

CROSS-REFERENCE TO RELATED APPLICATION

This application claims the benefit of and priority to U.S. Provisional Application No. 63/493,379, filed Mar. 31, 2023, titled "FLEXIBLE BANK ADDRESSING IN DIGITAL COMPUTING-IN-MEMORY (DCIM)," which is incorporated herein by reference in its entirety.

BACKGROUND

Developments in electronic devices, such as computers, portable devices, smart phones, internet of thing (IoT) devices, etc., have prompted increased demands for memory devices. In general, memory devices may be volatile memory devices and non-volatile memory devices. Volatile memory devices can store data while power is provided but may lose the stored data once the power is shut off. Unlike volatile memory devices, non-volatile memory devices may retain data even after the power is shut off but may be slower than the volatile memory devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 10A-11 illustrate example structures with flexible bank addressing using at least one additional multiplexer (MUX) and select signal (SEL) of the memory system of FIG. 2, in accordance with some embodiments.

DETAILED DESCRIPTION

Figure 1:
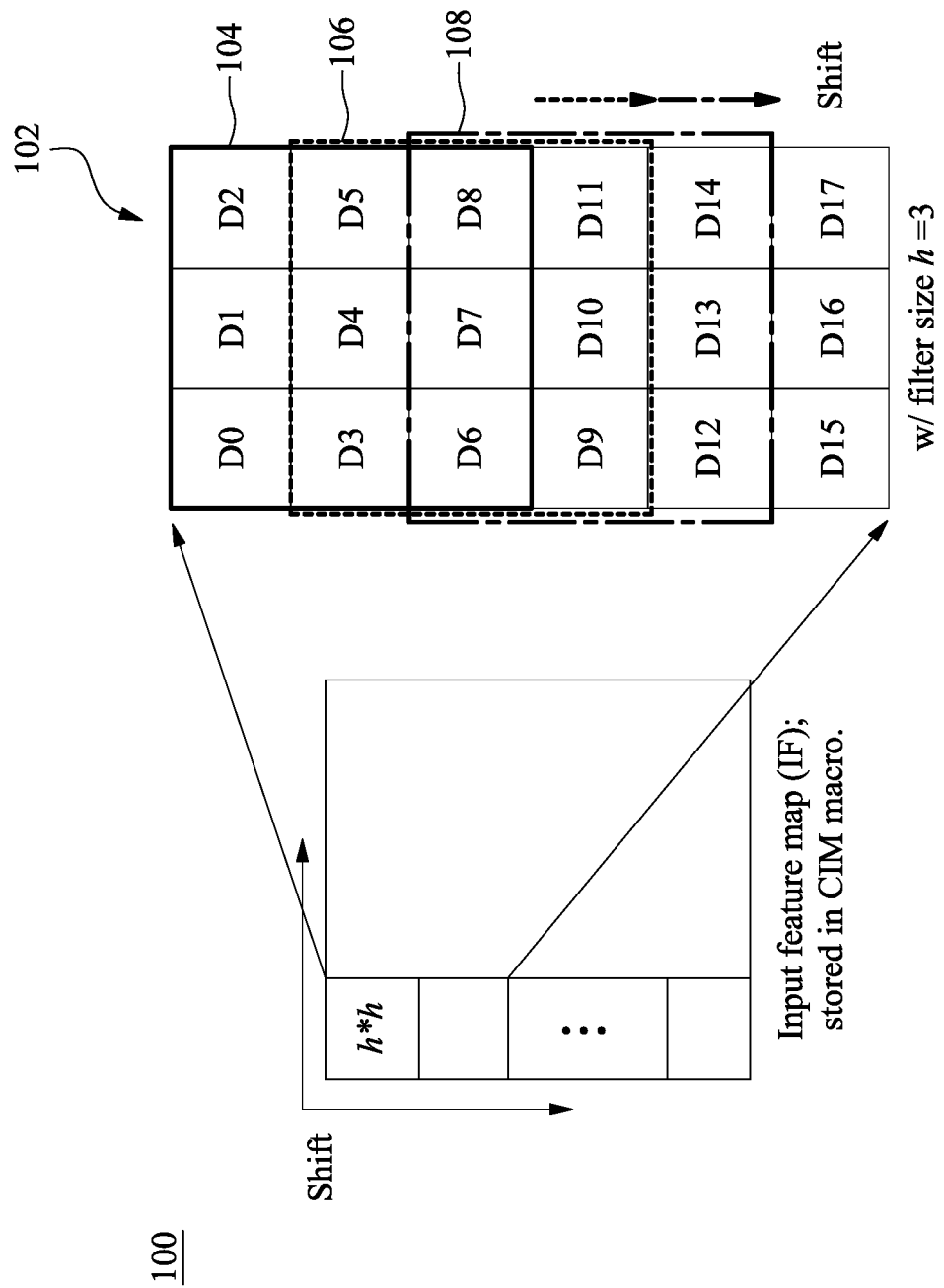
FIG. 1 illustrates an example of an input feature map (IF) shift, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In general, the present disclosure provides approaches for flexible bank addressing in digital computing-in-memory (DCIM). In certain systems, a DCIM array may support a single set of address inputs for row (e.g., address row) selection of a local bank (e.g., memory bank) in computing-in-memory (CIM) mode (e.g., a mode of the system configured to initiate CIM). A set of address inputs can include or refer to the signals or lines used to specify a certain memory location or cell within the memory bank. The memory bank can include or correspond to a group of memory cells or modules storing data in a computing device or system, for example. In the CIM mode, memory units storing data can be configured to perform certain computational tasks directly on the data, thereby allowing for parallel and distributed processing at the memory level, reducing data transfer to separate a processor, minimizing data movement, etc.

When considering an input feature map (IF) stationary (e.g., input data, such as for image processing or convolutional neural networks (CNN)), enhancing support of the IF shift may be desired to improve computing efficiency, minimize latency, or reduce resource consumption. In the context of convolutional input models (CiM), an input feature map refers to the initial representation of the input data that is fed into the CNN for processing. It can be thought of as a two-dimensional grid of values, where each value corresponds to a specific feature or characteristic of the input data.

For example, in image classification tasks, an input feature map could represent an image as a grid of pixel intensity values, with each pixel indicating the brightness or color information at a specific location in the image. This input feature map is then convolved with filters in the CNN to extract various features, such as edges, textures, or shapes, through successive convolutional layers. The input feature map serves as the starting point for information extraction and subsequent transformation within the CNN, allowing the network to learn hierarchical representations of the input data and make predictions based on those learned features. In some implementations, the input feature map can be applied in other contexts, not limited to CiM, which can refer to other types of input data, for example. In various implementations, the IF shift is performed to obtain the next IF data or update the IF data to be used for processing.

FIG. 1 provides an example of an IF shift (e.g., operation 100), in accordance with some embodiments. The operation 100 for shifting the IF can change at least a portion of the IF data, such as shown for portions 104, 106, 108 of array 102, where each portion represents respective IF data. Although the operation 100 shows the IF shifting downward for simplicity and for purposes of examples herein, in other configurations, an IF shift may refer to any one of lateral or vertical direction shifting. In this case, the operation 100 includes reading from banks (e.g., memory banks, such as but not limited to memory bank 212 of FIG. 2 or memory bank 410 of FIGS. 4A-7C) storing, including, or managing D0-8 in portion 104 (e.g., first IF data) of array 102. Each memory bank can contain at least a portion of the IF data. For instance, a first memory bank can contain D0, a second memory bank can contain D1, a third memory bank can contain D2, etc. Each memory bank can include one or more rows of data.

As shown in array 102, IF data can be read from different portions of the array 102. For example, for a filter size of 3 (e.g., 3×3 IF), the IF data read at a first time includes D0-D8 at portion 104. At a second time, IF data read includes D3-D11. At a third time, IF data read includes D6-D14. These IF data from the respective time can be used for, but not limited to, multiplication and accumulation (MAC) process/operation, such as for image processing or convolutional neural networks (CNN). To change from reading the portion 104 to portion 106, a shift can be performed by changing the row address for the memory banks. When a shift is applied for the IF, the operation 100 includes reading from memory banks containing D3-D11 in portion 106 (e.g., second IF data) of array 102. When another shift is applied for IF, the operation 100 includes reading from memory banks containing D6-D14 (e.g., third IF data) in portion 108 of array 102, and so forth. As shown in array 102, for each IF shift, a subset or portion of the IF data is changed while other portions, such as D3-D8 of the first IF data are the same for the second IF data, and D6-D8 of the first IF data are the same for the third IF data. Although FIG. 1 provides a 3×3 IF, different IF sizes may be used or similarly described herein, such as 2×2, 4×4, 5×5, etc. For simplicity, the 3×3 IF can be used for purposes of providing examples herein.

However, to change a portion of the IF data when performing the shift operation, certain systems or architectures are configured to change the row address for all memory banks. For example, in certain architectures, the row addresses are shared (or common) among the memory banks. To perform the IF shift in these architectures, the row address is updated for the various memory banks, and IF data is read from the various memory banks. In this configuration, different portions (e.g., portions 104, 106, 108) of the IF data of array 102 are duplicated across multiple address rows of the memory banks (e.g., shown in the overlapping of the portions 104, 106, 108). For instance, the memory banks (e.g., nine memory banks for 3×3 IF) can store D0-D8 in the first row used for reading the IF data of portion 104, D3-D11 in the second row used for reading the IF data of portion 106 (e.g., D3-D8 in the second row are duplicates of the first row), and D6-D14 in the third row used for reading the IF data of portion 108 (e.g., D6-D8 are duplicates of the first and second rows, and D9-D11 are duplicates of the second row).

Because of the data duplication across different rows of the memory banks (e.g., due to common row address), storage density or array efficiency may be degraded from accessing and reading the various memory banks in each clock cycle, and the CIM utilization ratio may be degraded because of the increase in write cycles to load the IF data (e.g., activation data) from the outside activation buffer (e.g., from another or external storage) into CIM storage, as part of the CIM operation. The IF data can be from the outside activation buffer because the size of the entire IF data may not fit within the CIM storage. The CIM utilization ratio can include or correspond to a macro utilization ratio, which can represent a sum of percentage number of resource usage level, such as for reading and/or writing operations in this case. Hence, the systems and methods of the technical solution discussed herein provide macro flexibility for flexible bank addressing. The flexible bank addressing may refer to the ability to address (or access) one or more memory banks individually or in subsets, instead of accessing the various memory banks at the same time because of the common row address. The systems and methods can provide different row addresses and/or different read-enable signals (e.g., read-enable bits (REB)) for one or more respective bank groups (e.g., memory bank groups (BGs)).

For example, in the CIM with IF shift, a portion of the IF data is changed responsive to the IF shift while other portions remain the same (e.g., D3-D8 of portion 104 remain the same when shifted to portion 106). In this case, because each bank group (e.g., including one or more memory banks) has a different row address and/or different enable signal (e.g., signal indicating to perform the read or write operation of the respective bank group), the systems and methods can perform the IF shift by selectively accessing at least one memory address (e.g., or switching to the row of the memory address) corresponding to the bank group with a new portion of the IF data. The systems and methods can skip or avoid accessing other memory addresses and/or reuse the same address and data corresponding to bank groups with the same portions of the IF data (e.g., when shifting to portion 106, avoid accessing D3-D8 previously read from certain corresponding bank groups). By flexibly (e.g., selectively) accessing row addresses for corresponding bank groups with new portions of the IF data, duplicated data is not required across multiple row addresses. In such cases, the systems and methods of the technical solution can minimize the IF switch, increase array efficiency, and improve the power, performance, area (PPA) efficiency, such as when performing, but not limited to, convolution operations (e.g., for CNN), dot products, etc.

Figure 2:
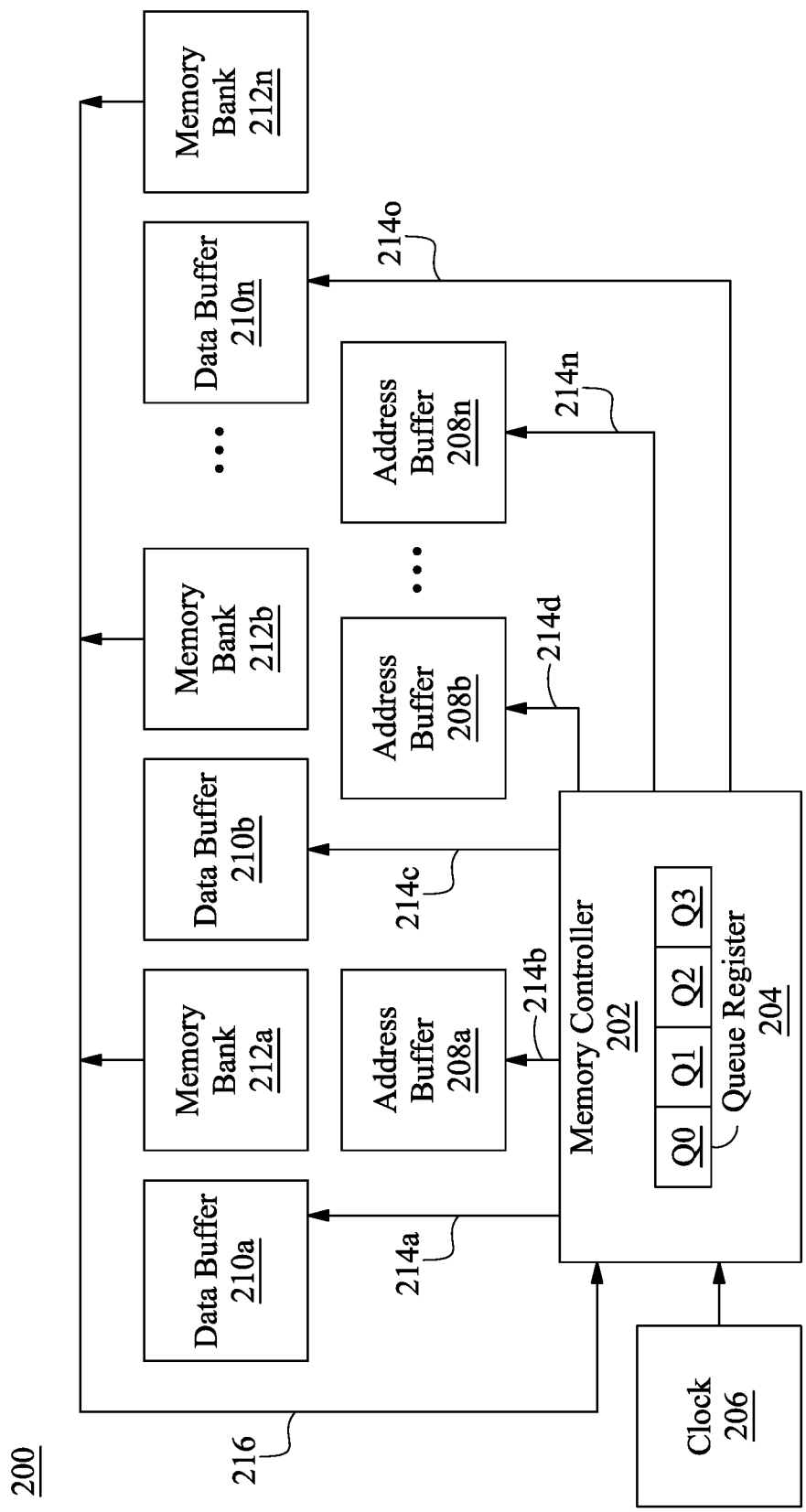
FIG. 2 illustrates a diagram of a memory system for performing the IF shift of FIG. 1, in accordance with some embodiments.

FIG. 2 is a diagram of a memory system 200 (or circuit), in accordance with some embodiments. The memory system 200 can be configured to, but is not limited to, perform the IF shift (e.g., operation 100) of FIG. 1, such as performing read operations to change at least a portion of the IF data, for example. In some embodiments, the memory system 200 includes a memory controller 202, a clock 206, address buffers 208a-n (sometimes referred to as address buffer(s) 208), data buffers 210a-n (sometimes referred to as data buffer(s) 210), and memory banks 212a-n (sometimes referred to as memory bank(s) 212). In some configurations, each memory bank 212 is electrically coupled to a corresponding data buffer 210 and a corresponding address buffer 208. In some configurations, each memory bank 212 is electrically coupled to the memory controller 202, where the memory controller 202 is electrically coupled to the data buffers 210, the address buffers 208, and the clock 206. In such configurations, these components may operate together to store data. In some embodiments, the memory system 200 includes more, fewer, or different components than shown in FIG. 2.

In some embodiments, the memory bank 212 is a hardware component or a circuit that stores data. The memory bank 212 may include multiple volatile memory cells or non-volatile memory cells. For example, in some embodiments, the memory bank 212 may include NAND flash memory cells. In other embodiments, the memory bank 212 may include NOR flash memory cells, static random access memory (SRAM) cells, dynamic random access memory (DRAM) cells, magnetoresistive random access memory (MRAM) cells, phase change memory (PCM) cells, resistive random access memory (ReRAM) cells, 3D XPoint memory cells, ferroelectric random-access memory (FeRAM) cells, and other types of memory cells. In some aspects, each memory cell is identified by a corresponding cell address, where each memory bank 212 is identified by a corresponding bank address.

In some embodiments, the data buffer 210 is a hardware component or a circuit that receives input data to be stored and applies the input data to the memory bank 212 to write the input data. In some embodiments, the address buffer 208 is a hardware component or a circuit that receives a cell address of the memory bank 212, at which the input data is to be stored, and configures the memory bank 212 to write the input data at the cell address. The data buffer 210 may receive the input data from a host processor (not shown) or the memory controller 202, and the address buffer 208 may receive the cell address from the host processor or the memory controller 202. In some aspects, the data buffers 210 receives respective control signals 214a, 214c, 2140, etc., from the memory controller 202 and the address buffers 208 receives respective control signals 214b, 214d, 214n, etc., from the memory controller 202. In response to the control signals 214a-o having a first state (e.g., logic state '1'), the data buffer 210 and the address buffer 208 may perform a write process to write input data to a memory cell corresponding to the cell address. In response to the control signals 214a-o having a second state (e.g., logic state '0'), the data buffer 210 and the address buffer 208 may not perform the write process. Hence, the data buffer 210 and the address buffer 208 can be configured in a synchronous manner to perform the write process on the memory bank 212, according to the control signals 214a-o from the memory controller 202.

In some embodiments, the memory controller 202 is a hardware component or an integrated circuit that configures the data buffers 210 and the address buffers 208 to perform the write process. In some embodiments, the memory controller 202 includes a queue register 204 including a set of entries (e.g., Q0, Q1, Q2, Q3). Each entry may be a storage circuit or a register that stores a bank address of at least one corresponding memory bank 212, on which to perform the write process. Although the queue register 204 shown in FIG. 2 includes four entries Q0 Q3, the queue register 204 may include a different number of entries. In some aspects, the memory controller 202 receives an input bank address or a vector of bank addresses from the host processor. If an entry is empty, the memory controller 202 may update the entry to store the input bank address. If all the entries are full, the memory controller 202 may block updating the entries, and may instruct or cause the host processor to stop sending input bank addresses until updating the entries is unblocked. According to the bank addresses stored by the queue register 204, the memory controller 202 may generate control signals 214 for configuring the data buffers 210 and provide the control signals 214 to the data buffers 210. Similarly, according to the bank addresses stored by the queue register 204, the memory controller 202 may generate control signals 214 for configuring the address buffers 208 and provide the control signals 214 to the address buffers 208. For example, if an entry Q0 has a bank address of the memory bank 212a and the memory bank 212a is clear-to-write, the memory controller 202 may generate the control signals 214 to configure the data buffer 210a and the address buffer 208a to perform the write process on the memory bank 212a.

In some configurations, the memory controller 202 configures the data buffers 210 and the address buffers 208 according to a clock cycle corresponding to a period of a clock signal from the clock 206. For example, the memory controller 202 configures a data buffer 210 and an address buffer 208 to perform the write process for a predetermined number of clock cycles to successfully write input data to a memory bank 212. In some aspects, the memory controller 202 provides the control signals 214 to the data buffers 210 and the address buffers 208 according to a phase of the clock signal, such that the write process can be performed on multiple memory banks in parallel, or in a pipeline configuration in a synchronous manner.

In some aspects, the memory controller 202 receives, from each memory bank 212, a complete signal 216 indicating that the write process on the memory bank 212 is completed and manage manages or update updates the queue register 204 according to the complete signal 216. In some examples, the complete signal 216 having a first state (e.g., logic '1') may indicate that the write process on the memory bank 212 is complete. In another example, the complete signal 216 having a second state (e.g., logic '0') may indicate that the write process on the memory bank 212 is still pending.

In some embodiments, similar to the writing process, the memory controller 202 is configured to send one or more control signals 214 to one or more signals to the individual address buffers (or individual groups of address buffers) to perform a read operation. For example, the address buffer 208 is a hardware component or a circuit that receives a cell address of the memory bank 212, at which data is to be read, and configures the memory bank 212 to read the data at the cell address. The data buffer 210 can be a hardware component or a circuit that obtains and stores data read from the memory bank 212. In this case, each memory bank 212 includes input data (e.g., IF data) for reading by the memory controller 202. These data can be read by the memory controller 202 in each clock cycle, for example. The address buffers 208, data buffers 210, and memory banks 212 may be configured into groups, such as respective groups of memory banks 212.

In some implementations, each memory bank 212 can be coupled or in communication with a respective register, such as but not limited to register 412 of FIGS. 4A-7C. The register can be configured to store read data from the respective memory bank 212. For instance, after performing the read operation, the memory bank 212 can forward or send the read data for storage in a register. The data in the register may be deleted by the memory controller 202 or overwritten responsive to the corresponding memory bank 212 performing another read operation. When performing the read or write operations, at least one or multiple groups of memory banks 212 may be accessed by changing the respective address buffer(s) 208 corresponding to the group of memory banks 212, for example. In this case, the complete signal 216 can indicate that the read process on the memory bank 212 is completed and manage or update the queue register 204 according to the complete signal 216.

Figure 3:
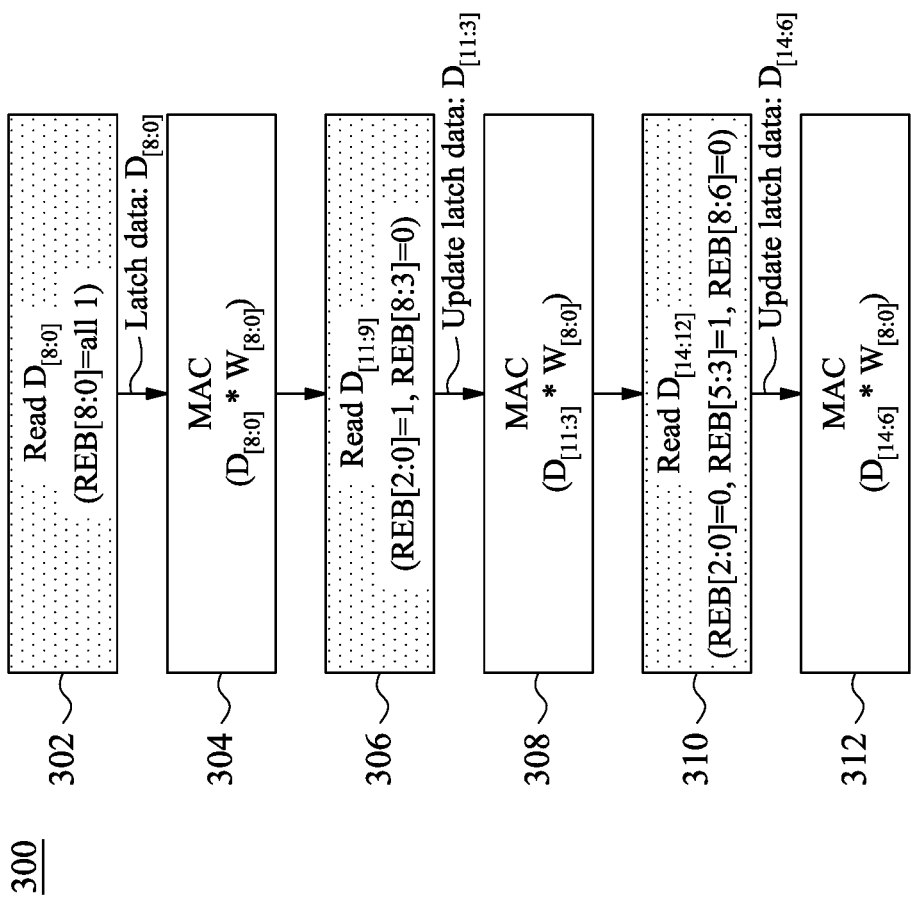
FIG. 3 illustrates an example method for flexible bank addressing of the memory system of FIG. 2, in accordance with some embodiments.
Figure 4A:
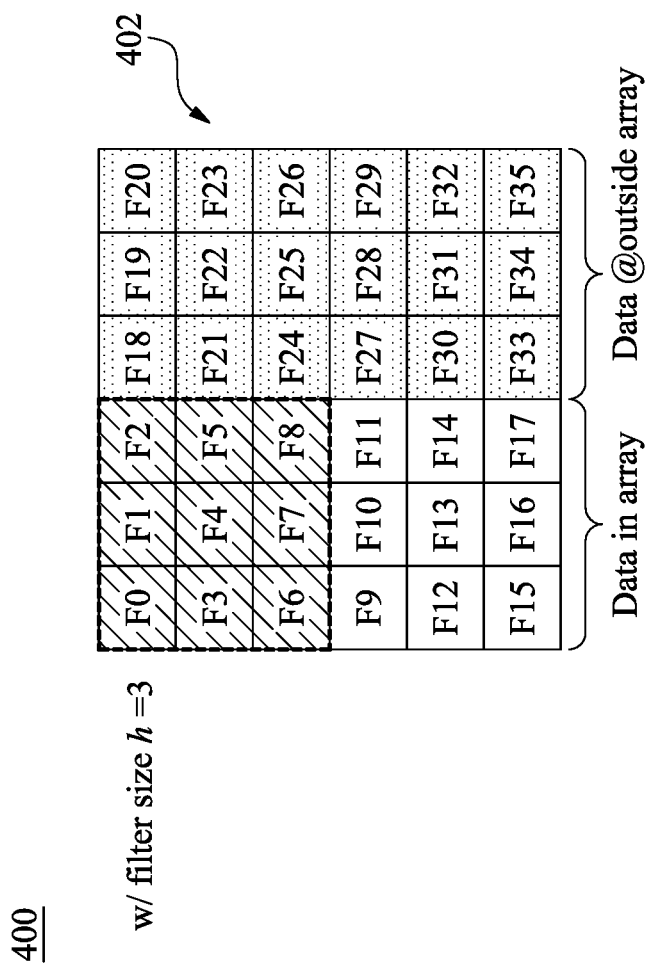
FIGS. 4A-7C illustrate example operations for computing-in-memory (CIM) cycles of the memory system of FIG. 2, in accordance with some embodiments.
Figure 4B:
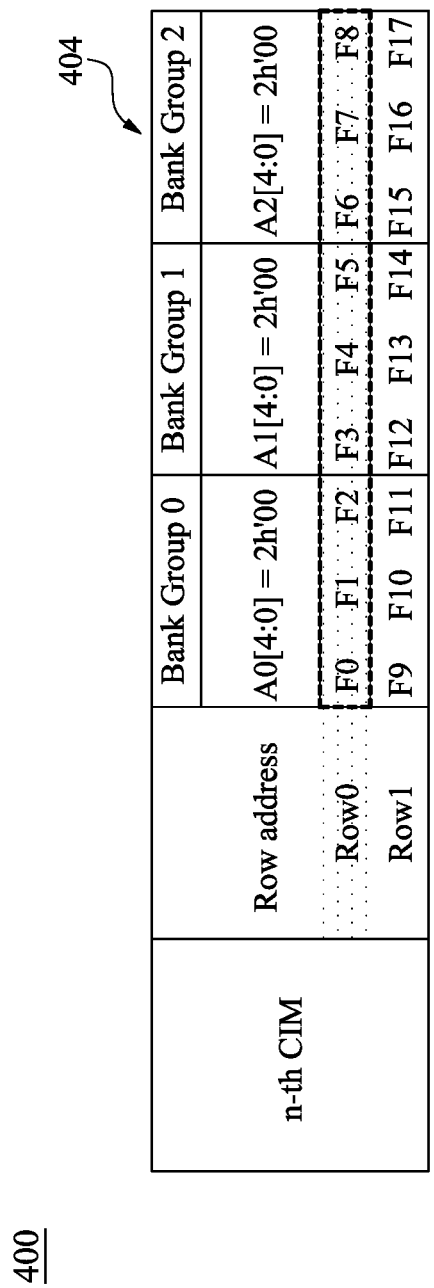
Figure 4C:
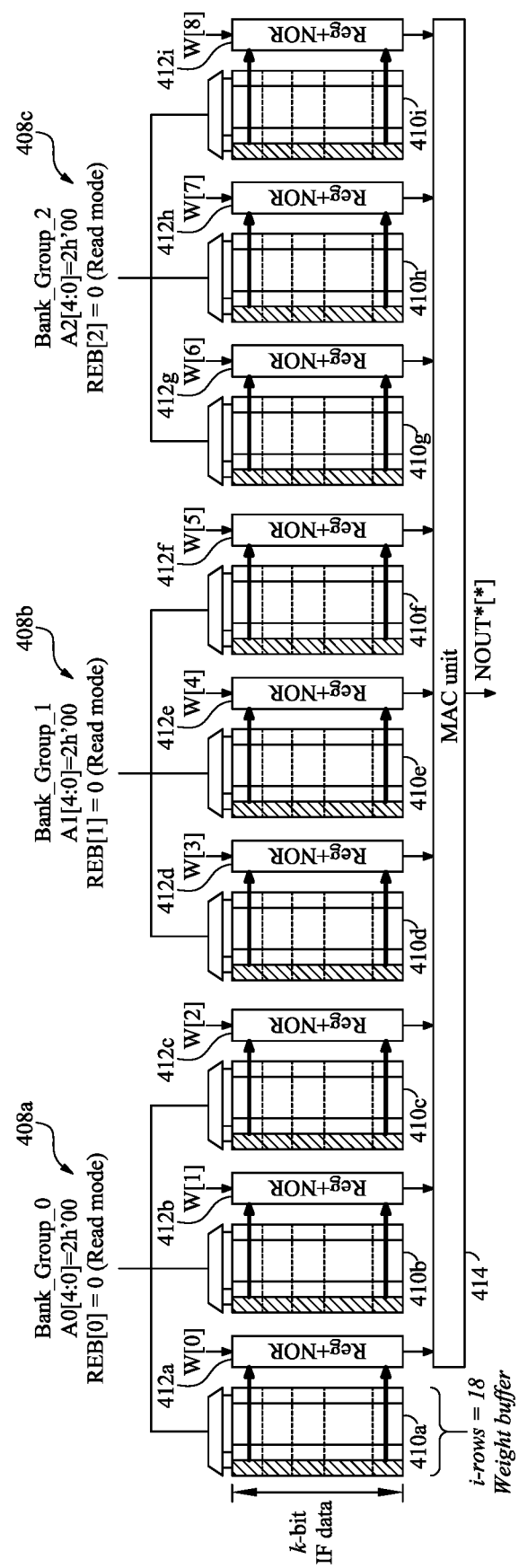
Figure 5A:
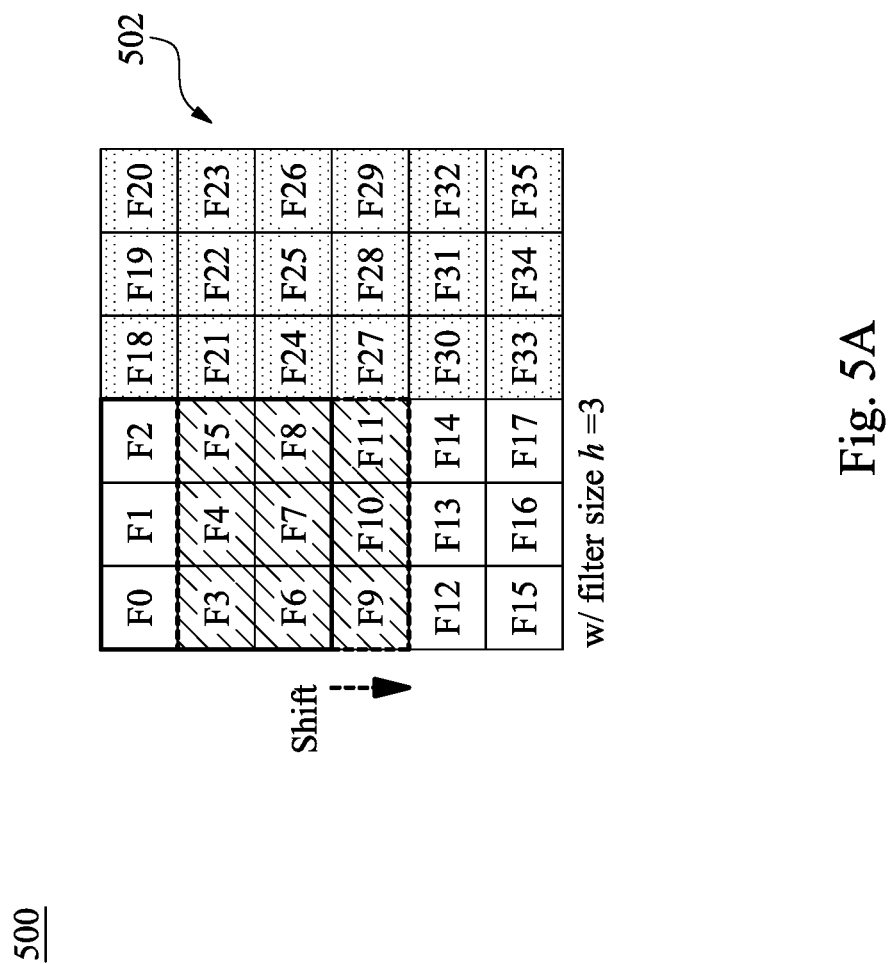
Figure 5B:
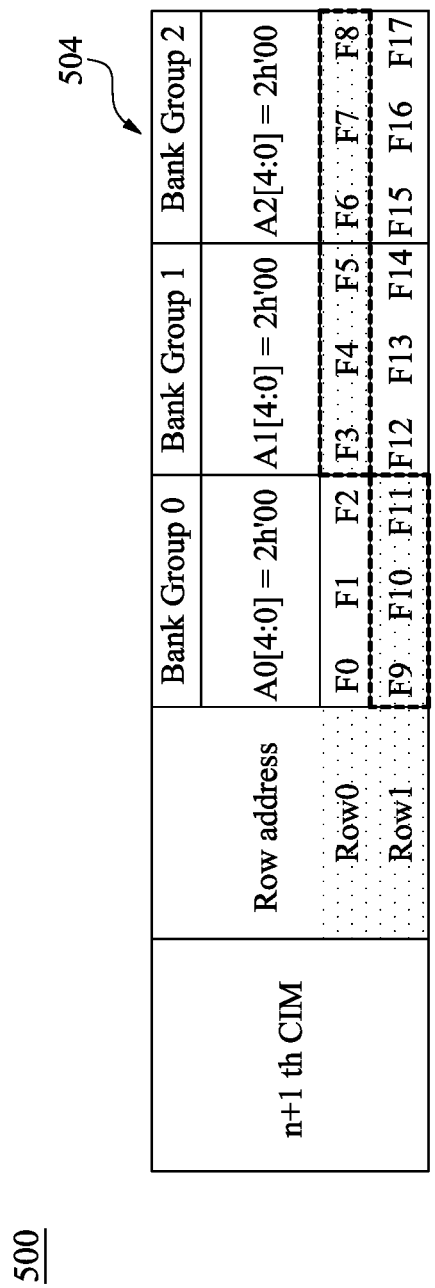
Figure 5C:
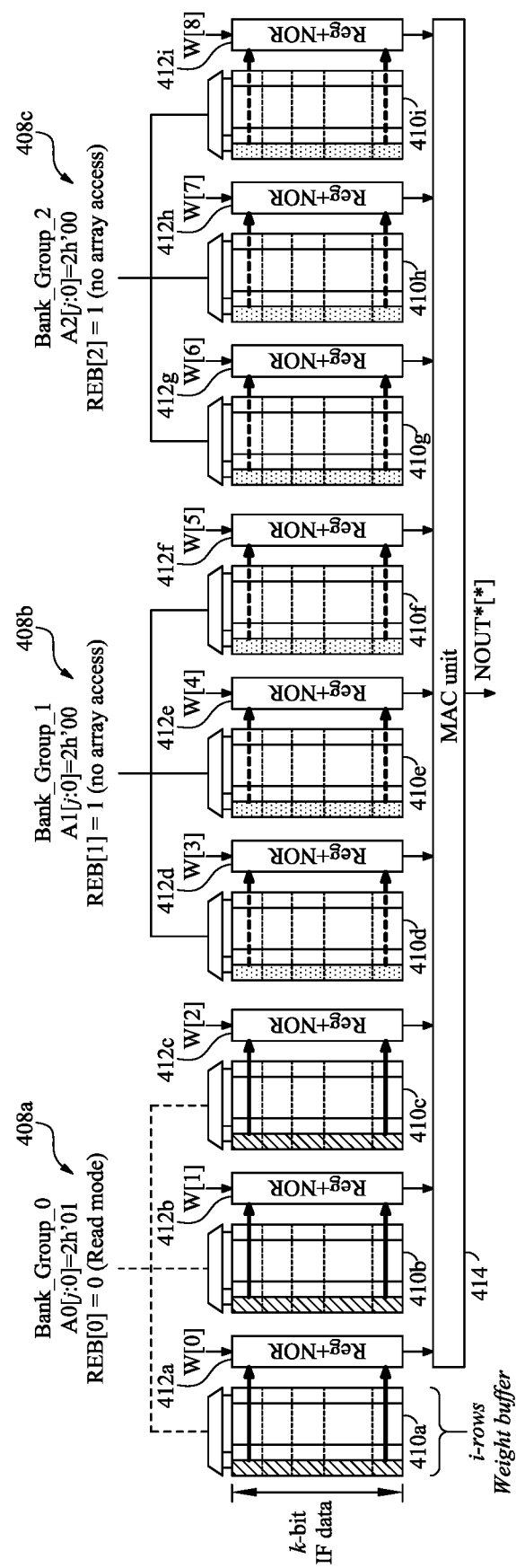

Referring to FIG. 3, depicted is an example method 300 for flexible bank addressing of the memory system 200 of FIG. 2, in accordance with some embodiments. For example, at least some of the operations (or steps) of the method 300 can be used to perform flexible bank addressing. The method 300 can be performed by the memory system 200 of FIG. 2. In some implementations, the method 300 can be performed by other devices or entities configured with features or functionalities similar to the memory system 200, for example. It is noted that the method 300 is merely an example, and is not intended to limit the present disclosure. Accordingly, it is understood that additional operations may be provided before, during, and after the method 300 of FIG. 3, and that some other operations may only be briefly described herein. Additionally, operations of the method 300 may be performed in an order different from that described herein to achieve desired results.

In some embodiments, operations of the method 300 may be associated with the various operations, architectures, or structures, such as described in conjunction with at least one of FIG. 1 or 4A-7C. In brief overview, the method 300 includes operations 302-312 for reading data from memory banks and performing MAC process in response to reading the data. Each of the operations 302-312 can be performed in a respective clock cycle (e.g., CIM clock cycle). For instance, operation 302 can be performed in a first clock cycle, operation 304 can be performed in a second clock cycle, operation 306 can be performed in a third clock cycle, etc. The method 300 can include other operations, for instance, to process remaining data in a memory array (e.g., other memory banks). In some implementations, more than one of the operations 302-312 can be performed in a single clock cycle, such as operations 302, 304 in a first clock cycle, operations 306, 308 in a second clock cycle, operations 310, 312 in a third clock cycle, etc. In various configurations, the read operations (e.g., operations 302, 306, 310) of FIG. 3 can used to perform the IF shift, such as to shift from portion 104 to portion 106 (e.g., from operation 302 to operation 306) or shift from portion 106 to portion 108 (e.g., from operation 306 to operation 310), for example.

Referring to FIGS. 4A-7C, depicted are example operations 400-700 for CIM cycles (e.g., clock cycles) of the memory system 200 of FIG. 2, in accordance with some embodiments. Each of the operations 400-700 can correspond to or be described in conjunction with, but not limited to, at least one of the operations 302-312 of FIG. 3, such as to perform the IF shift as described in conjunction with FIG. 1. FIGS. 4A-7C show arrays 402, 502, 602, 702 (e.g., DCIM arrays), tables 404, 504, 604, 704, and memory bank structures 406, 506, 606, 706 at different clock cycles, such as a first clock cycle, a second clock cycle, a third clock cycle, and a fourth clock cycle, respectively. The memory bank structures 406, 506, 606, 706 show bank groups 408a-c (e.g., referred to as bank group(s) 408). Each bank group 408 includes respective one or more memory banks 410a-i (e.g., referred to as memory bank(s) 410), such as corresponding to, but not limited to, memory banks 212. The memory banks 410 are coupled to or in communication with respective registers 412a-i (e.g., referred to as register(s) 412). Each register can store data read from the corresponding memory bank 410.

The arrays 402, 502, 602, 702 support multiple sets of address inputs for address row selection of memory banks 410. The arrays 402, 502, 602, 702 show the IF shift at respective clock cycles, which can be described similarly but not limited to the array 102 of FIG. 1, for example. The tables 404, 504, 604, 704 provide illustrative examples of the data being read or stored in a register 412 (e.g., may include register, latch, and/or multiplier) at the corresponding operations 400-700, such as similar to the arrays 402, 502, 602, 702 showing the IF shift and changes to the IF data. For example, array 402 and table 404 show that F0-F8 data (e.g., similar to D0-D8 data of FIG. 1) from the memory banks 410 are read or stored in corresponding registers 412. In another example, array 502 and table 504 show that F3-F11 data (e.g., similar to D3-D11 data of FIG. 1) from the memory banks 410 are read or stored in corresponding registers 412, etc.

In the example operations 400-700, an input or weight filter map size of three (e.g., 3×3) can be configured for the arrays 402, 502, 602, 702. Three bank groups 408 can be configured, such as shown in tables 404, 504, 604, 704, and memory bank structures 406, 506, 606, 706. Each bank group 408 includes three memory banks 410, thereby totaling nine memory banks 410 for performing the example operations 400-700. Further, in the example operations 400-700, there are a total of 18 rows (e.g., address rows) configured for the memory banks 410. Although specific numbers of filter size, bank groups 408, memory banks 410, and/or address rows are provided in example operations 400-700, other numbers of filter sizes, bank groups 408, memory banks 410, and/or address rows can be used in a similar manner. Further, although a respective MUX is shown above each memory bank 410 for selecting a row from the memory bank 410, other components can be utilized, not limited to the MUX, to perform the row selection.

Corresponding to operation 302 of FIG. 3, FIGS. 4A-C depict the example operation 400 for a first CIM cycle of the memory system 200, in accordance with some embodiments. At this clock cycle of the operation 400, the memory controller 202 is configured to perform a read operation for data F0-F8 corresponding to row 0 of the bank groups 408, such as shown in array 402, table 404, and/or memory bank structure 406. In this case, F0-F2 can correspond to a first portion of the IF data (e.g., sometimes referred to as first data or set of data) from a first address associated with a first bank group (e.g., bank group 408a), F3-F5 can correspond to a second portion of the IF data (e.g., sometimes referred to as second data or set of data) from a second address associated with a second bank group (e.g., bank group 408b), and F6-F8 can correspond to a third portion of the IF data (e.g., sometimes referred to as third data or set of data) from a third address associated with a third bank group (e.g., bank group 408c). These sets of data can be read from individual memory banks 410 of the respective bank groups 408.

For example, the row addresses (e.g., the first, second, and third addresses) for the bank groups 408 can be set to zero (e.g., A0-A2 [4:0]=2h'00). The memory controller 202 can initiate the read mode for the bank groups 408, such as by transmitting control signals 214 to the address buffers 208 and the data buffers 210 corresponding to the memory banks 410 of the bank groups 408. In this case, the control signals 214 (such as shown in FIG. 2, for example) include read enable signals of '0' indicating for the address buffers 208 and the data buffers 210 to perform the read operation. As shown in the example memory bank structure 406, the memory controller 202 can read data F0-F8 from row 0 (e.g., the first row) of the memory banks 410a-i. In various implementations, responsive to completing the read process, the memory controller 202 can receive the complete signal 216 from each memory bank 410 indicating that the read process has been completed.

In some implementations, the memory controller 202 can send the control signals 214 to the memory banks 410 (or the corresponding bank groups 408) for triggering the memory banks 410 to perform the read operation (e.g., REB[2:0] =3b'000). For example, the memory controller 202 can send the REB for each bank group 408, such as REB[0] for the first bank group 408a, REB[1] for the second bank group 408b, and REB[2] for the third bank group 408c. Since each bank group 408 includes three memory banks 410, each REB can include three bits, where '0' can represent the read mode. Hence, the memory controller 202 can send REB of 3b'000 for each bank group 408. In some cases, the memory controller 202 may send a respective REB (e.g., 1b'0) for individual memory banks 410 to initiate the read mode.

After each memory bank 410 read the data from the corresponding row address, the read data can be stored in the corresponding register. For example, memory bank 410a stores its read data to register 412a, memory bank 410b stores its read data to register 412b, memory bank 410c stores its read data to register 412c, etc. In some implementations, the memory banks 410 may send the respective read data to other registers or storage devices/components thereof, not limited to the registers 412.

At operation 304 of FIG. 3, the memory controller 202 (or other devices in communication with the memory controller 202) is configured to provide the read data (e.g., first iteration of input) for performing a MAC operation (e.g., or for a neural network). In this case, the read data includes the first portion of the IF data from bank group 408a, the second portion of the IF data from bank group 408b, and the third portion of the IF data from bank group 408c, for example. The memory controller 202 can read out the data from the memory banks 410 (e.g., nine memory banks 410, in this case) for the data free flow (DFF) in the same (or different) clock cycle for MAC operation. The DFF can refer to the unrestricted movement or exchange of data, for instance, across different components. For example, responsive to reading the data from the memory banks 410 or responsive to receiving the complete signal 216 from the memory banks 410, the memory controller 202 can read out (or send) the read data (e.g., F0-F8) for the DFF, such as to the registers 412 and/or the MAC unit 414 for MAC operation, for example.

In some configurations, the read out IF values (e.g., the IF data read from the memory banks 410) can be stored in the latch in the LIO. The read out IF values can be used for the MAC process. For example, at least a part of the MAC process can be performed by respective multipliers (e.g., NOR), associated with the respective registers 412. The multipliers can be in electrical communication with the respective memory banks 410. Each multiplier is configured to multiply k-bit weight input (e.g., denoted as W[x], where this 'x' represents the corresponding memory bank 410) and k-bit IF data. The k-bit weight input can include or be a predetermined weight input, such as defined or configured by the administrator or user (e.g., by the software). The k can represent the number of bits associated with the weight input and/or the IF data. In some cases, the weight input can correspond to IF data F0-F8. In some other cases, the weight input can correspond to other data in the arrays 402, 502, 602, 702, for example.

The result from the multipliers can be accumulated in a MAC unit 414. The MAC unit 414 may sometimes be referred to as an accumulator (ACC) unit. In this case, the MAC unit 414 can be configured to accumulate the products (e.g., results from the multipliers) to output a sum as the accumulated result. For example, the MAC unit 414 can receive the product of each multiplier. The MAC unit 414 can add or sum the products from the multipliers to generate an accumulated result. In some cases, the MAC unit 414 may sum the products from the multipliers with a previous accumulated result, such as from a previous clock cycle, to generate the (e.g., current) accumulated result. For instance, the results from the MAC unit at operation 400 can be used for accumulation with the multiplication results (e.g., from the multipliers) at operation 500, and so on. The MAC unit can output the accumulated result to other devices, entities, or computation units according to system configuration, thereby completing the MAC process.

In some implementations, the MAC unit 414 can be configured to perform the features or functionalities of the multiplier. In this case, the MAC unit 414 can receive the data stored in the registers 412. Responsive to receiving the data, the MAC unit 414 can perform the multiplication and accumulation process to generate an output (e.g., NOUT). In some cases, the register 412 can store the results (e.g., products) from the corresponding multiplier to output for the MAC unit 414, such that the MAC unit 414 can accumulate the products.

Corresponding to operation 306 of FIG. 3, FIGS. 5A-C depict the example operation 500 for a second CIM cycle of the memory system 200, in accordance with some embodiments. At this clock cycle (e.g., a second clock cycle) of the operation 500, the memory controller 202 is configured to perform a read operation for data F9-F11 corresponding to row 1 of the bank group 408a, such as shown in array 502, table 504, and/or memory bank structure 506. In this case, F9-F11 can correspond to a fourth portion of the IF data (e.g., sometimes referred to as fourth data or set of data) read from a fourth address associated with the first bank group 408a. The fourth portion of the IF data read can be read or used for MAC operation with (or simultaneous/concurrent to) the second portion and/or the third portion of the IF data. For example, the memory controller 202 can receive a signal from the clock 206 to execute a subsequent read operation. The memory controller 202 can perform the IF shift to change a portion of the IF data by enabling read mode and changing the row address for at least one bank group 408. As shown, the addresses (e.g., second address and third address) for bank group 408b and bank group 408c remain the same. Hence, the data stored in the registers associated with the memory banks 410 of bank groups 408b, 408c can be maintained or remain the same as in the previous clock cycle (e.g., the first clock cycle).

As shown in array 502, IF shift can change the IF data to F3-F11. The IF data F9-F11 can be a new portion of the IF data caused by the IF shift. The IF data F3-F8 can remain the same as in the previous clock cycle. As shown in the table 504 and the memory bank structure 506, the IF data F9-F11 are stored in the memory banks 410a-c of the bank group 408a. Because the row addresses are separated for each bank group 408, the memory controller 202 can flexibly change row address(es) for at least one specific bank group 408. In this case, the memory controller 202 can change the row address for bank group 408a, while avoiding accessing other bank groups (e.g., bank groups 408b-c) corresponding to the same IF data portion F3-F8.

For example, the memory controller 202 can update the row address for the bank group 408a including the memory banks 410a-c. The memory controller 202 can send control signals to the memory banks 410a-c to read IF data from the second row (e.g., row 1). The memory controller 202 may not access other bank groups 408b-c. In this case, when not accessing a respective bank group 408, the REB can be set to '1', such as REB[1]=1 and REB [2]=1. Subsequently, the memory controller 202 can read out the IF data from row 1 of bank group 408a to perform the MAC operation using IF values F3-F11. Although REB=0 is used to enable the read mode and REB=1 is used to disable the read mode, REB=1 and REB=0 may be used for enabling or disabling the read mode, respectively, in some other configurations.

At operation 308 of FIG. 3, the memory controller 202 is configured to provide the read data for performing the MAC operation. The MAC unit 414 can be used to perform the MAC operation on data read from the one or more memory banks 410. In this case, the read data can include the fourth portion of the IF data from bank group 408a, the second portion of the IF data from bank group 408b (e.g., read in the previous clock cycle), and the third portion of the IF data from bank group 408c (e.g., also read in the previous clock cycle). The operation 308 can be performed using similar features or functionalities as described in conjunction with at least operation 304 of FIG. 3.

Corresponding to operation 310 of FIG. 3, FIGS. 6A-C depict the example operation 600 for a third CIM cycle of the memory system 200, in accordance with some embodiments. At this clock cycle of the operation 600, the memory controller 202 is configured to perform a read operation for data F12-F14 corresponding to row 1 of the bank group 408b, such as shown in array 602, table 604, and/or memory bank structure 606. In this case, F12-F14 can correspond to a fifth portion of the IF data (e.g., sometimes referred to as fifth data or set of data) from a fifth address associated with the second bank group 408b. The fifth portion of the IF data can be read or used for MAC operation simultaneous to the third portion of the IF data and/or the fourth portion of the IF data. For example, the memory controller 202 can receive a signal from the clock 206 to execute a subsequent read operation. The memory controller 202 can perform the IF shift to change a portion of the IF data by enabling read mode and changing the row address for at least one bank group 408. The memory controller 202 can perform one or more features similar to the operation 500 for the IF shift. In this case, the memory controller 202 can change the row address of the bank group 408b. The memory controller 202 can transmit control signals to the memory banks 410d-f for these memory banks 410 to perform the read operation. In this case, the memory banks 410d-f can read out IF data F12-F14 from row 1. The memory controller 202 may not perform the read operation for other bank groups 408, such as bank groups 408a, 408c because F6-F11 are the same IF data read in the previous clock cycle.

In various implementations, a write operation can be performed concurrently with (e.g., in the same clock cycle as) the read operation at different rows. In this case, the memory controller 202 can initiate a write operation for at least one other bank group 408, such as bank group 408a, concurrent to the read operation performed in bank group 408b. For example, the memory controller 202 can perform an IF update (e.g., write operation) for bank group 408a in the same clock cycle as reading bank group 408b because there is no read out operation by memory banks 410a-c (e.g., memory banks 410a-c are not performing the read operation in this clock cycle). In this example, the memory banks 410 can correspond to single port cells, which can perform either read or write operations. Hence, while performing the read operation in bank group 408b, the memory controller 202 can initiate a write operation for bank group 408a because bank group 408a is not performing the read operation, for example.

To perform the write operation, the memory controller 202 can send a control signal to at least one of memory banks 410a-c of bank group 408a. In this case, the control signals include or correspond to the write enable signal (e.g., write enable bit (WEB)), such as WEB=0 for write mode and WEB=1 for no write mode. For instance, the memory controller 202 can update the row address and transmit the write enable signal '0' to the memory bank 410a (e.g., as shown in memory bank structure 606). The memory bank 410a can perform the write operation responsive to receiving the write enable signal '0' from the memory controller 202.

To perform the write operation, the memory controller 202 can provide an address to the address buffer 208 indicating the row address of the memory bank 410 to store the data. The memory controller 202 can provide the data to the data buffer 210 to be stored in the provided row address of the memory bank 410. The data buffer 210 and the address buffer 208 can be configured to synchronously perform the write operation to the memory bank 410, such as row 0 of memory bank 410a in this case. After completing the write operation, the memory bank 410 can send the complete signal to the memory controller 202 indicating that the write operation is completed for the respective memory bank 410. Although WEB=0 is used to enable the write mode and WEB=1 is used to disable the write mode, WEB=1 and WEB=0 may be used for enabling or disabling the write mode, respectively, in some other configurations.

At operation 312 of FIG. 3, the memory controller 202 is configured to provide the read data for performing the MAC operation. In this case, the read data can include the fourth portion of the IF data from bank group 408a, the fifth portion of the IF data from bank group 408b, and the third portion of the IF data from bank group 408c. The operation 312 can be performed using similar features or functionalities as described in conjunction with at least one of operations 304 or 308 of FIG. 3.

Figure 7A:
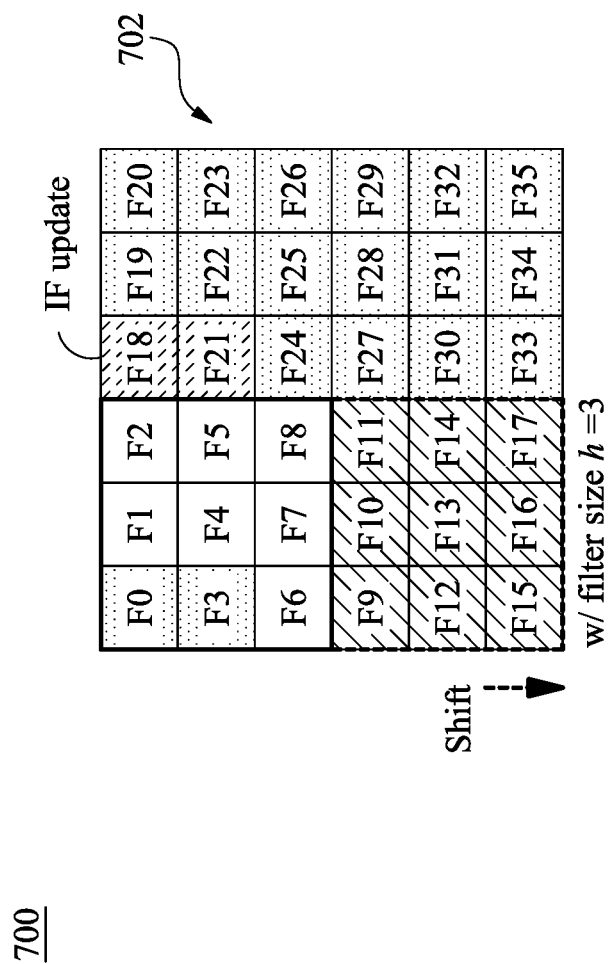
Figure 7B:
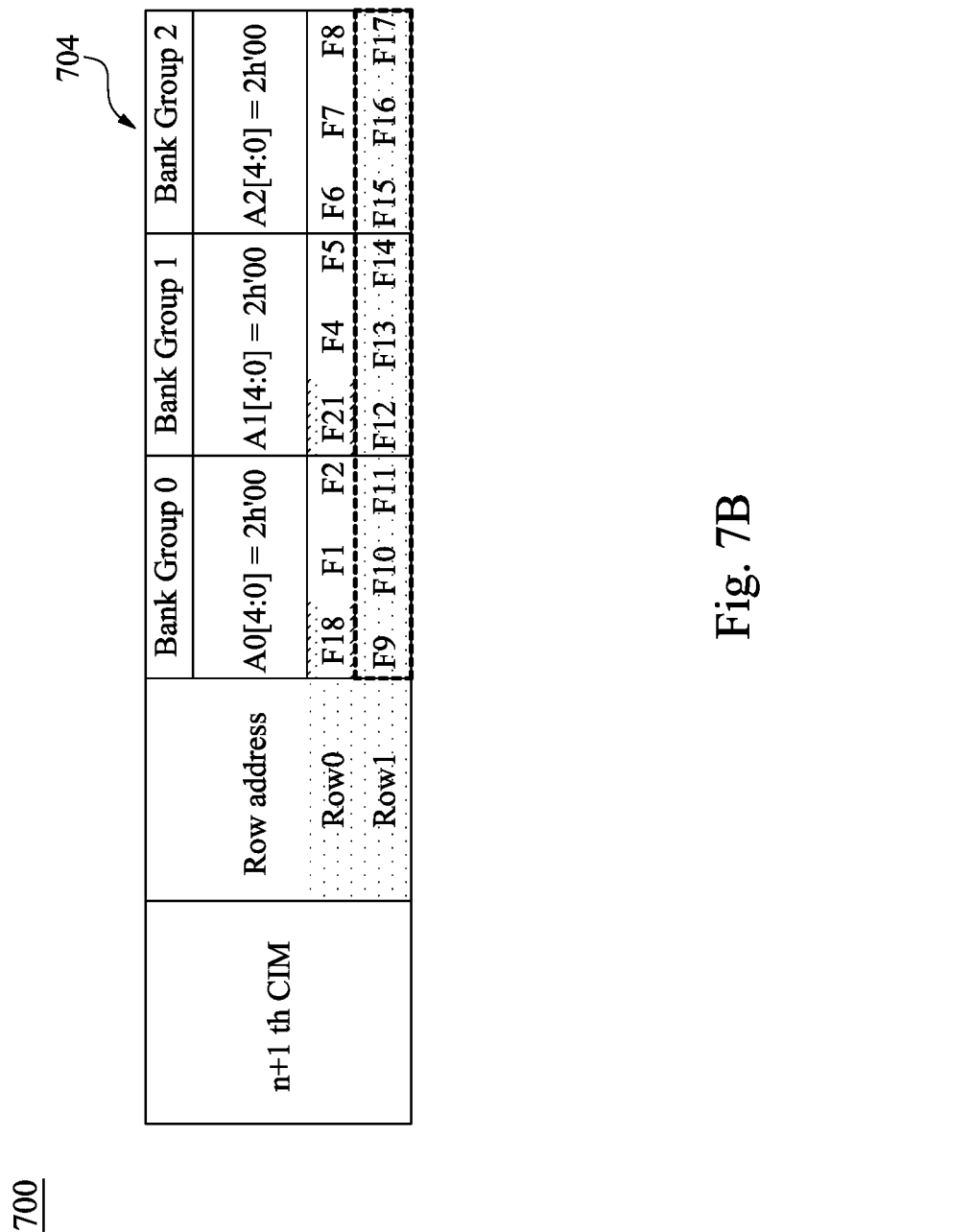
Figure 7C:
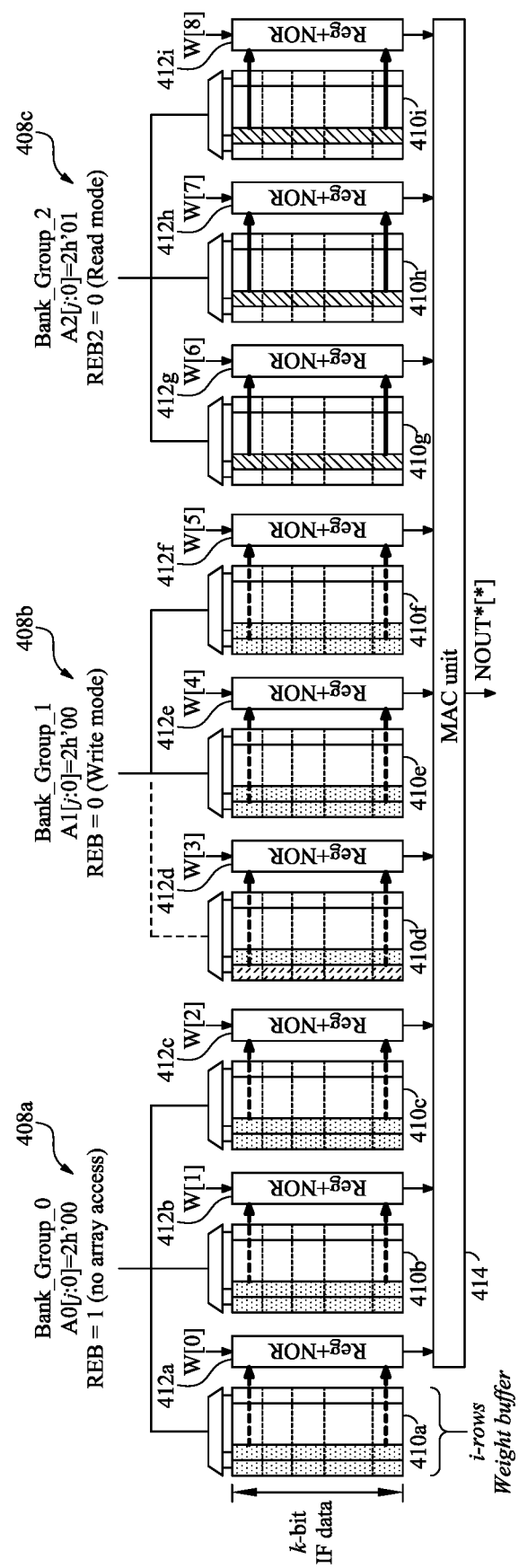

In the example operation 700 of FIGS. 7A-C, the memory controller 202 is configured to perform another IF shift to update a portion of the IF data in a subsequent clock cycle, such as similar to the example operation 600. In this case, the memory controller 202 executes the IF shift by initiating a read operation (or enabling read mode) for bank group 408c to access and/or read a sixth portion of the IF data (e.g., sometimes referred to as sixth data or set of data), including F15-F17, for example. As shown in tables 404, 504, 604, 704, the first to sixth portions of the IF data can form contiguous first to sixth rows of the row addresses, respectively. For example, the memory controller 202 is configured to change the row address for memory banks 410g-i. The memory controller 202 is configured to send control signals to memory banks 410g-i. The control signals can correspond to read enable signals (e.g., REB) of '0' indicating for the memory banks 410g-i to perform the read operation in the row address provided by the memory controller 202. The memory controller 202 can signal other memory banks 410 associated with other bank groups 408 to disable read mode, such as REB=1. Responsive to reading the data, the memory banks 410g-i can send a complete signal to the memory controller 202 indicating that the read operation is completed.

Figure 6A:
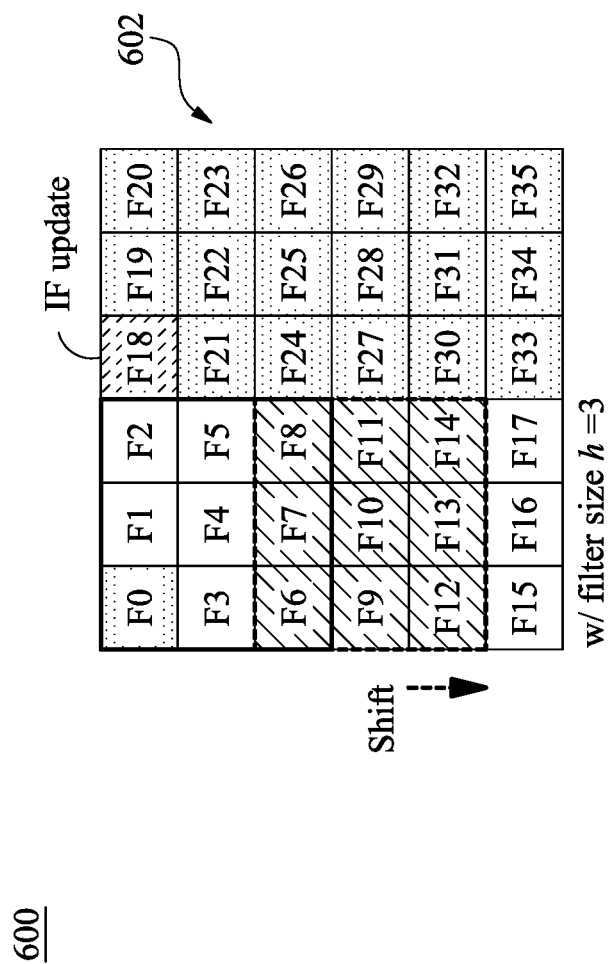
Figure 6B:
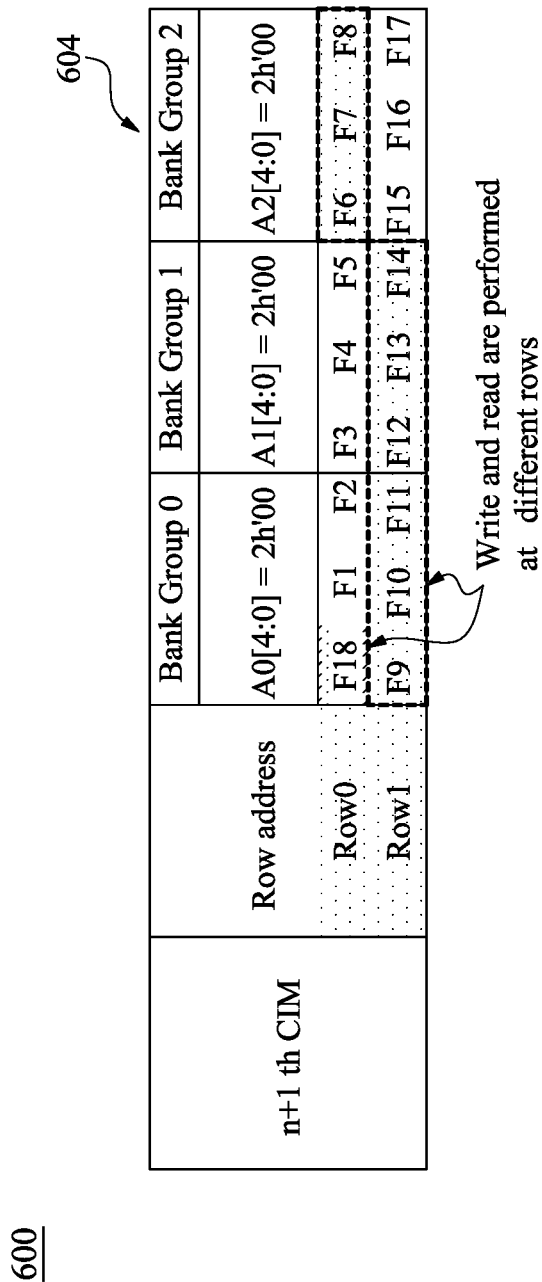
Figure 6C:
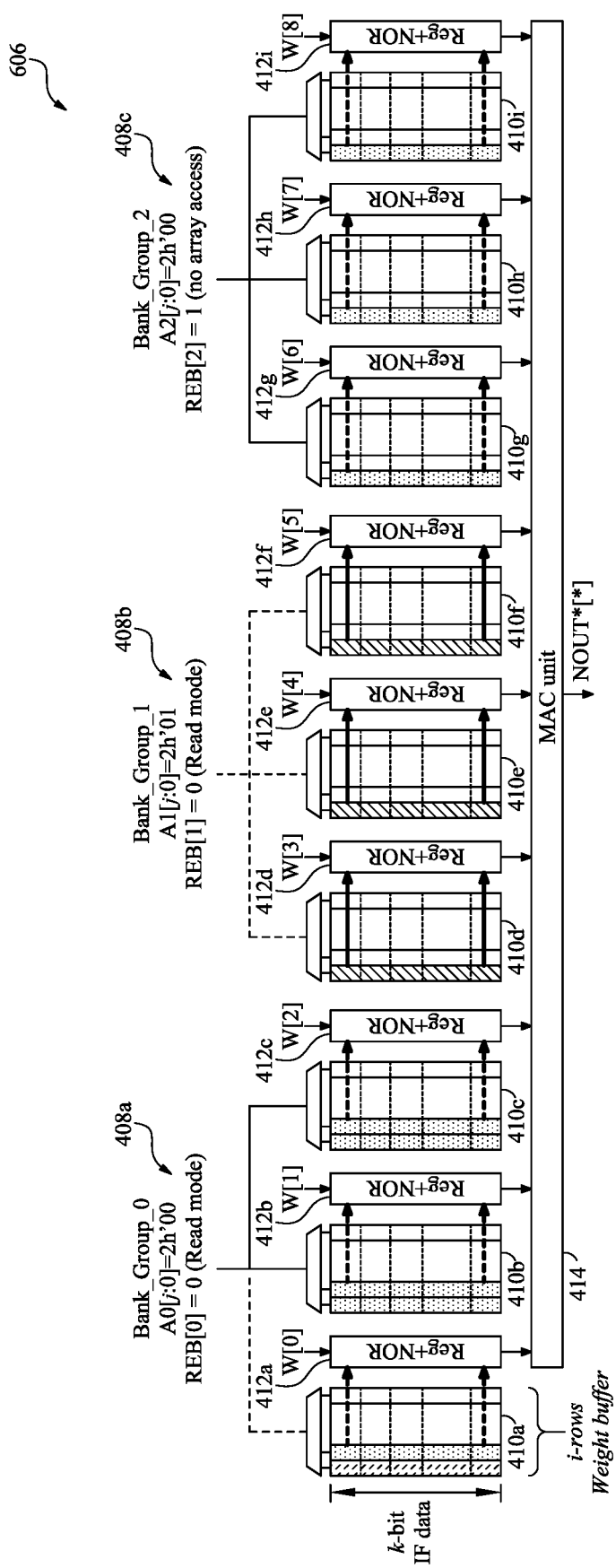

In some implementations, such as described similarly but not limited to operation 600 of FIGS. 6A-C, the memory controller 202 can enable the write mode for at least one memory bank 410 in other bank groups 408 with no read out operation, in operation 700. For instance, the memory controller 202 can update the address (e.g., via the address buffer 208) for writing data to at least memory bank 410*d*. The memory controller 202 can provide the data (e.g., via the data buffer 210) for storing in the address of the memory bank 410*d*. The memory controller 202 can provide a write enable signal '0' for the memory bank 410*d* to initiate the write mode. Responsive to completing the write operation, the memory controller 202 is configured to receive a complete signal from the memory bank 410*d*, for example. In some cases, the memory controller 202 can initiate the write operation for other memory banks 410, different from the memory banks 410 of bank group 408*c* (e.g., in read mode).

Subsequently, and similar to at least one of operations 304, 308, 312, the memory banks 410*g-i* can read out the data to the multiplier (corresponding to or associated with respective register 412) and the MAC unit 414 to perform the MAC operation. Since IF data F9-F14 are previously read out to the respective multipliers, the multiplier can use the same data to compute the product for the MAC unit 414. The MAC unit 414 can accumulate the products from individual multipliers to generate an accumulated result. In some cases, the MAC unit 414 can accumulate these products with the previous accumulated result to generate a (e.g., current) accumulated result.

Figure 8A:
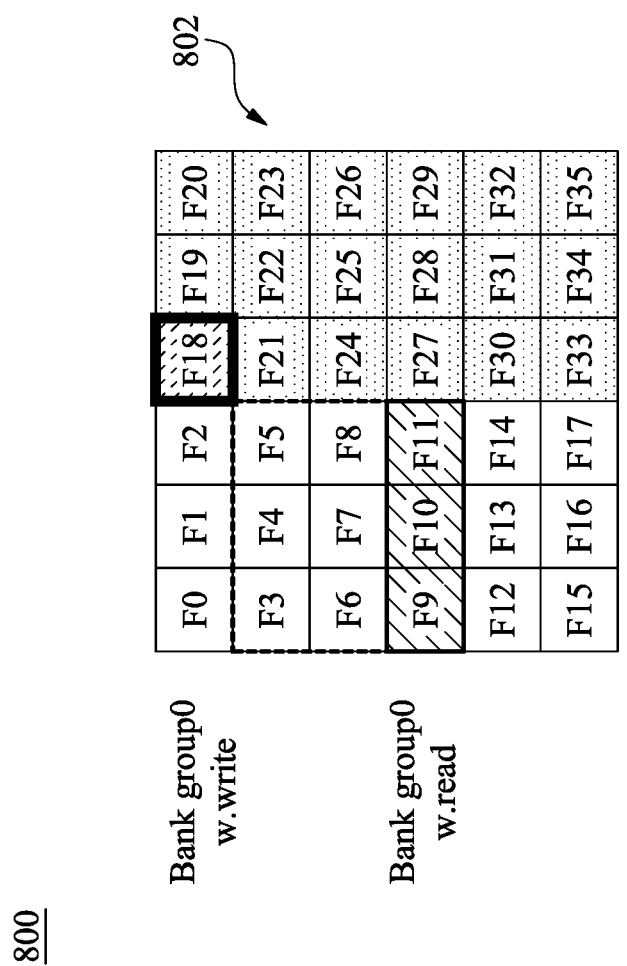
FIGS. 8A-C illustrate an example read and write operation for a single port memory of the memory system of FIG. 2, in accordance with some embodiments.
Figure 8B:
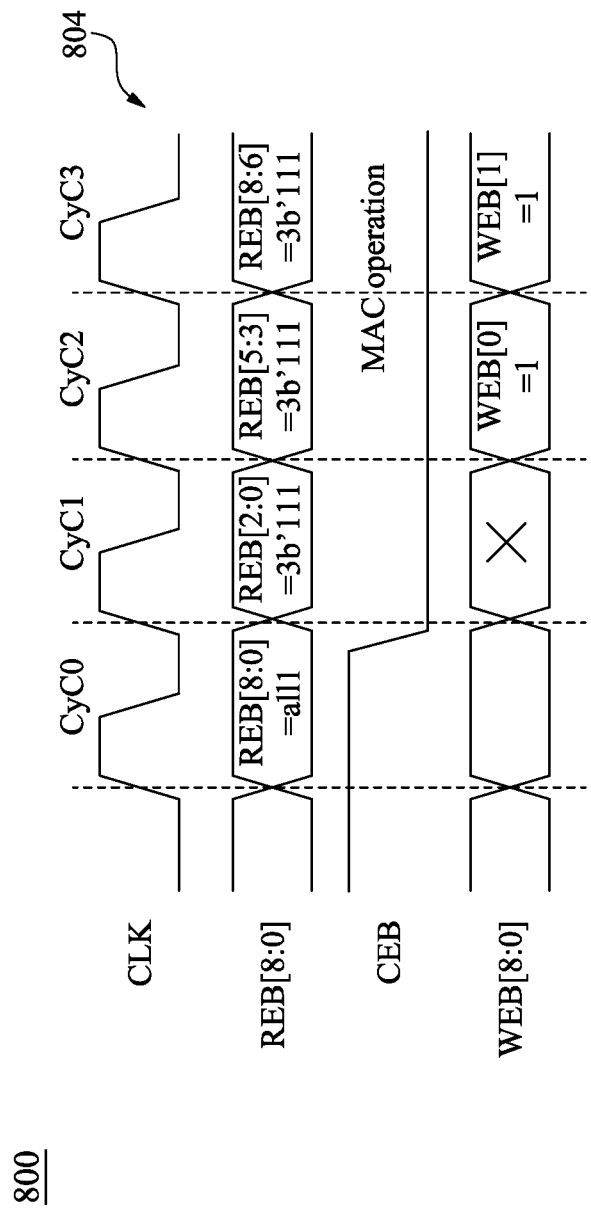
Figure 8C:
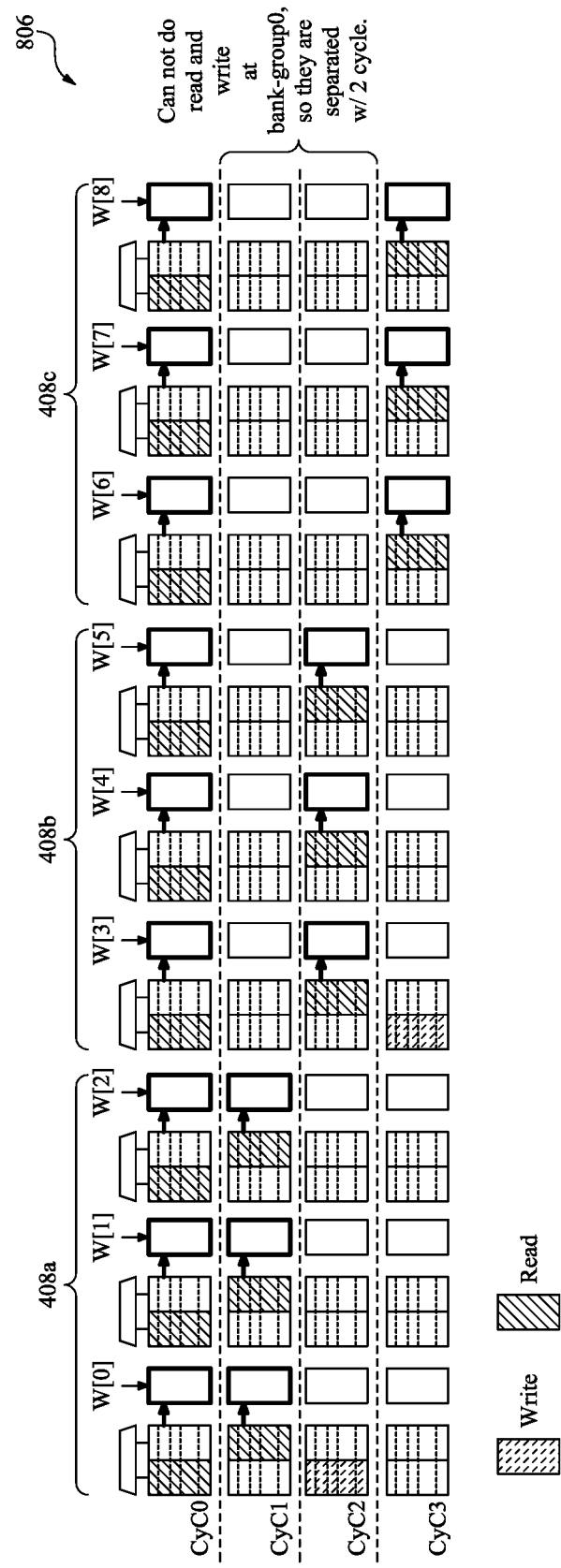

Referring to FIGS. 8A-C, depicted is an example read and write operation 800 for a single port memory of the memory system 200 of FIG. 2, in accordance with some embodiments. The operation 800 can be performed by one or more components of the memory system 200, such as the memory controller 202, the address buffers 208, the data buffers 210, the memory banks 212, 410, etc. In various implementations, the memory banks 410 may be configured or structured as a single port cell. The operation 800 for reading and writing data with the single port memory can be described in conjunction with at least one of the example operations 400-700, for example.

The example operation 800 can be performed with the single port memory (e.g., single port memory banks). FIGS. 8A-C shows examples of array 802, timing diagram 804, and memory bank structures 806 performed using the single port memory banks. Using single port memory banks (e.g., memory cells) can improve area efficiency because of the compact cell size (e.g., size of the memory cells). In some cases, the array 802 can correspond to or be described in conjunction with at least one of but not limited to array 102, 402, 502, 602, 702 of FIG. 1 or 4A-7C. In some cases, the timing diagram 804 can represent the clock cycles, such as corresponding to or may be described in conjunction with, but not limited to, the operations 400-700 of FIGS. 4A-7C, for example. The memory bank structures 806 can provide illustrative examples of the read and/or write operations (or no access) of the one or more memory banks 410 of the bank groups 408.

The array 802 can indicate the IF data to be read in a second cycle (e.g., cycle 1) of the memory controller 202. The timing diagram 804 can indicate the states of the read enable signals (e.g., REB), write enable signals (e.g., WEB), and/or CIM enable signal (CEB) (e.g., 0 can represent active state and 1 can represent inactive state, or vice versa depending on the configuration) for various memory banks 410 during four clock cycles (e.g., clock cycle 0, 1, 2, and 3, respectively). The memory bank structures 806 can indicate the read and write operations perform by the memory banks 410 during the four clock cycles corresponding to the timing diagram 804. The memory bank structures 806 can include three bank groups 408, where each bank group 408 includes three memory banks 410 (e.g., total of nine memory banks 410, such as described similarly to FIGS. 4A-7C).

In the first clock cycle (e.g., clock cycle 0), the memory controller 202 can access the memory banks 410 (e.g., the nine memory banks 410) to initiate a read operation by sending read enable signals (e.g., REB=0). The memory controller 202 can configure the row address of the memory banks 410 to read out the data. Responsive to receiving the read enable signals, the memory banks 410 can perform the read operation to read data in the provided row address (e.g., first row, such as row 0), such as a first row address of the bank groups 408. In this case, the memory banks 410 can read IF data F0-F8. The memory controller 202 or the memory banks 410 can send the read data to the multiplier (associated with a respective register 412) and/or the MAC unit 414, such as to perform the MAC operation at the next clock cycle.

In the second clock cycle (e.g., clock cycle 1), the memory controller 202 can initiate the IF shift to change a portion of the IF data, such as changing F0-F2 to F9-F11. For example, the memory controller 202 can change the row address for the memory banks 410 of the first bank group 408*a*. The memory controller 202 can transmit control signals (e.g., read enable signals '0') to the memory banks 410 of the first bank group 408*a* for these memory banks 410 to perform the read operation. The memory controller 202 may not access the memory banks 410 of other bank groups 408 (e.g., bank groups 408*b-c*) because F3-F8 are previously read in the first clock cycle. Responsive to receiving the read enable signals, the memory banks 410 of the first bank group 408*a* can read the data from the second row (e.g., row 1). In this case, the memory banks 410 of the first bank group 408*a* can read IF data F9-F11. The memory controller 202 or the memory banks 410 can provide the read data to the multiplier (associated with a respective register 412) and/or the MAC unit 414 to perform the MAC operation. In this clock cycle, among other subsequent clock cycles, the MAC unit 414 can perform the MAC operation by accumulating (e.g., summing) the results from the multiplier in the first clock cycle. For instance, at clock cycle 1 in this case, the MAC operation can be activated to accumulate the results from the multiplier in clock cycle 0

In the third clock cycle (e.g., clock cycle 2), the memory controller 202 can perform another IF shift. For example, the memory controller 202 can change the row address of the memory banks 410 of the second bank group 408*b*. The memory controller 202 can send the read enable signals '0' to these memory banks 410 to perform the read operation. The memory controller 202 may not send the read enable signals (or set the read enable signals to '1') to other bank groups 408 because other portions of the IF data are the same as in the previous clock cycle (e.g., read in the previous clock cycle). The MAC unit 414 can perform the MAC operation at this clock cycle 2 by accumulating the results from the accumulation at clock cycle 1 with the read data from clock cycle 1.

In the case of a single port cell, the memory controller 202 can initiate a write operation for at least one memory bank 410 of bank group 408*a* concurrent to the read operation of bank group 408*b*. The write operation can be to provide an IF update (e.g., input feature data) from another storage (e.g., external storage) to the CIM storage. For instance, because the memory banks 410 of each bank group 408 share a row address, the read operation and the write operation for bank group 408*a* can be separated into two clock cycles. In this case, one of the clock cycles is used for the read operation to perform the IF shift, and the other clock cycle is used for the write operation after completing the read operation. The memory controller 202 can initiate the write operation, for instance, by sending the write enable signal (e.g., WEB=0) to the memory bank 410 of the corresponding bank group 408.

Similarly to the third clock cycle, in the fourth clock cycle (e.g., clock cycle 3), the memory controller 202 can perform a subsequent IF shift to change a portion of the IF data. In this case, the memory controller 202 can change the row address of the memory banks 410 associated with the third bank group 408c. The memory controller 202 can send the read enable signals 'O' to these memory banks 410 to perform the read operation. In the case of a single port cell, the memory controller 202 can initiate a write operation for at least one memory bank 410 of bank group 408a concurrent to the read operation of bank group 408b. For instance, because the memory banks 410 of each bank group 408 share a row address, the read operation and the write operation for bank group 408a can be separated into two clock cycles. In this case, one of the clock cycles is used for the read operation to perform the IF shift, and the other clock cycle is used for the write operation after completing the read operation. The memory controller 202 can initiate the write operation, for instance, by sending the write enable signal (e.g., WEB=0) to the memory bank 410 of the corresponding bank group 408

Figure 9A:
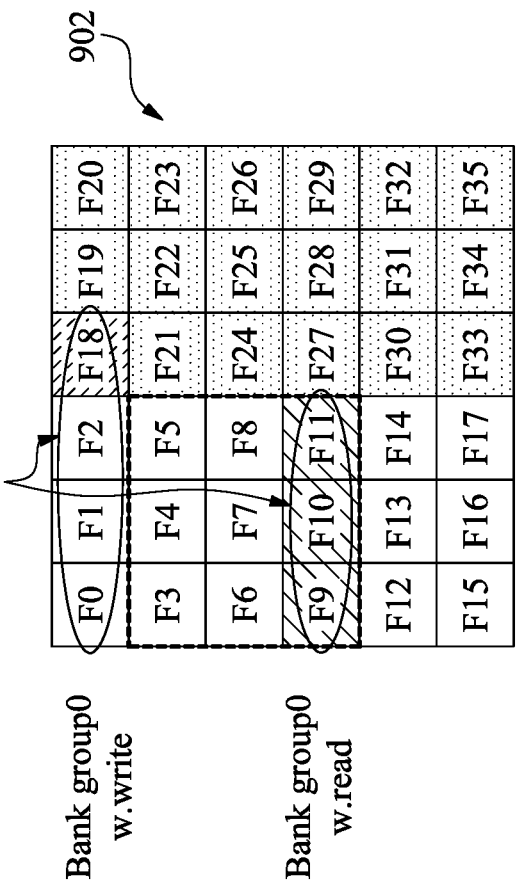
FIGS. 9A-C illustrate an example read and write operation for a multiport memory of the memory system of FIG. 2, in accordance with some embodiments.
Figure 9B:
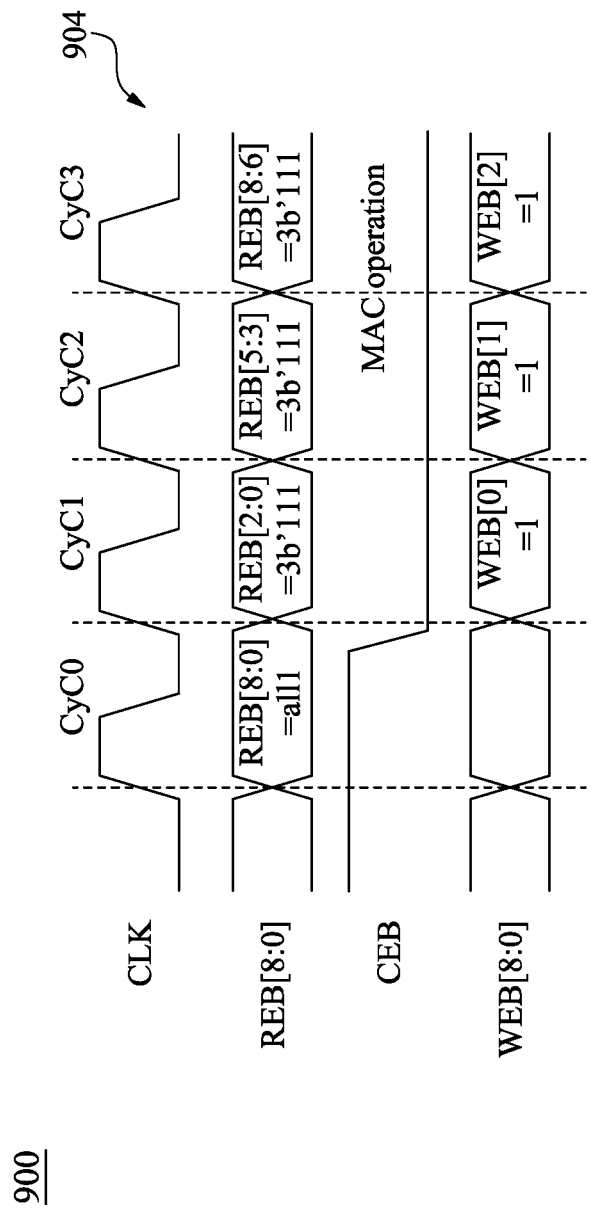
Figure 9C:
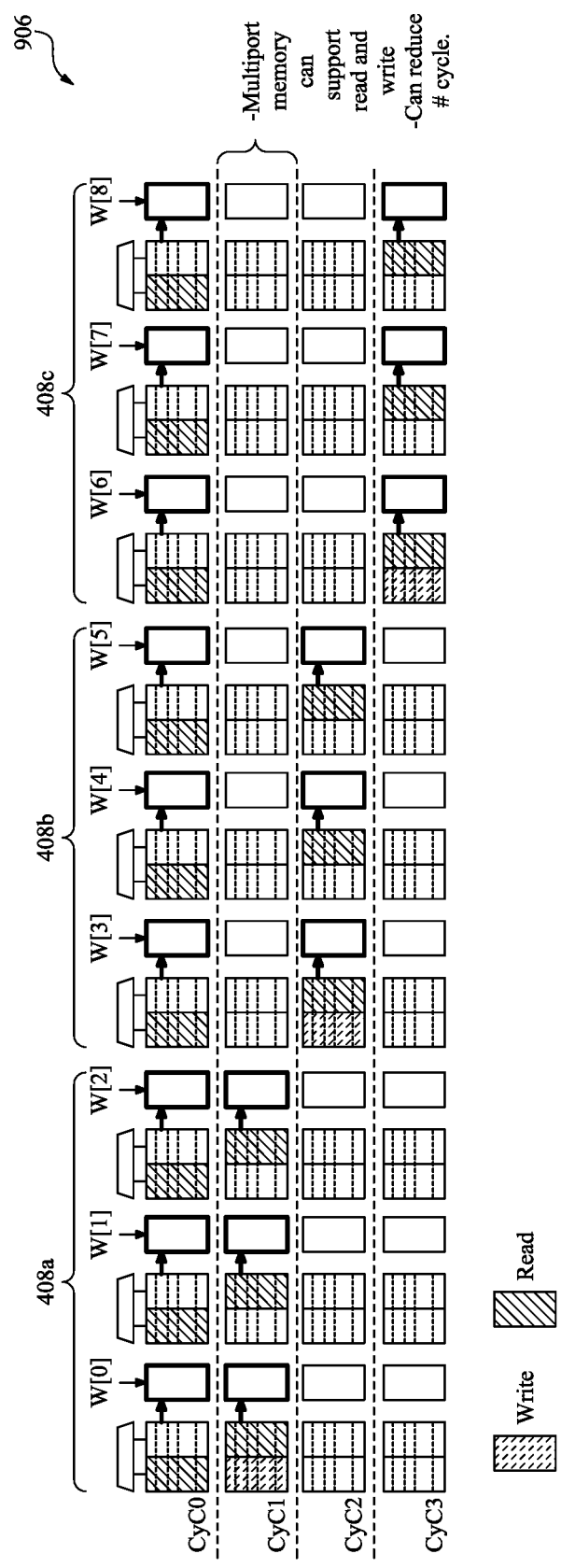

Referring to FIGS. 9A-C, depicted is an example read and write operation 900 for a multiport memory of the memory system of FIG. 2, in accordance with some embodiments. The operation 900 can be performed by one or more components of the memory system 200, such as the memory controller 202, the address buffers 208, the data buffers 210, the memory banks 212, 410, etc. In various implementations, the memory banks 410 may be configured or structured as a multi port cell to support simultaneous read and write, such as for at least one memory bank 410 of a bank group 408 to perform read and write operations within the same clock cycle. In some cases, the array 902 can correspond to or be described in conjunction with at least one of but not limited to array 102, 402, 502, 602, 702 of FIG. 1 or 4A-7C. In some cases, the timing diagram 904 can represent the clock cycles, such as corresponding to or may be described in conjunction with, but not limited to, the operations 400-700 of FIGS. 4A-7C, for example. The memory bank structures 906 can provide illustrative examples of the read and/or write operations (or no access) of the one or more memory banks 410 of the bank groups 408.

The example operation 900 can be performed with the multi port memory (e.g., multi port memory banks). FIGS. 9A-C show examples of array 902, timing diagram 904, and memory bank structures 906 performed using the multi port memory banks. The array 902 can indicate the IF data to be read in a second cycle (e.g., cycle 1) of the memory controller 202. The timing diagram 904 can indicate the states of the read enable signals (e.g., REB), write enable signals (e.g., WEB), and/or CEB for various memory banks 410 during four clock cycles (e.g., clock cycle 0, 1, 2, and 3, respectively). The memory bank structures 906 can indicate the read and write operations perform performed by the memory banks 410 during the four clock cycles corresponding to the timing diagram 904. The memory bank structures 906 can include three bank groups 408, where each bank group 408 includes three memory banks 410 (e.g., total of nine memory banks 410, such as described similarly to FIGS. 4A-7C).

In the first clock cycle (e.g., clock cycle 0), the memory controller 202 can access the memory banks 410 by sending the read enable signals '0' to the bank groups 408. Responsive to receiving the read enable signals, the memory banks 410 can perform the read operation, such as to read IF data or values F0-F8 in this clock cycle.

In the second clock cycle (e.g., clock cycle 1), the memory controller 202 can perform the IF shift by changing the row address for the memory banks 410 of the first bank group 408a and sending the read enable signal '0' to these memory banks 410 (e.g., REB[2:0]=0). Because the memory banks 410 are multi port memory cells, the memory banks 410 can support simultaneous read and write. For example, as shown in the memory bank structures 906 and the timing diagram 904, in clock cycle 1, the memory controller 202 can send the write enable signal to at least one of the memory banks 410 of the first bank group 408a simultaneous to sending the read enable signals. Subsequently, the one or more memory banks 410 of the first bank group 408a can be configured to simultaneously perform the read and write operations. The memory banks 410 can send the read out to the multiplier (e.g., associated with a respective register 412) and the MAC unit 414 to perform the MAC operations.

Similar to the clock cycle 1, the memory controller 202 can initiate the read and write operations for the memory banks 410 in the third clock cycle (e.g., clock cycle 2) and the fourth clock cycle (e.g., clock cycle 3). For example, in the clock cycle 2, the memory controller 202 performs another IF shift by changing the row address of the memory banks 410 of the second bank group 408b and sending the read enable signals to these memory banks 410. Simultaneously, the memory controller 202 can send the write enable signal to at least one of the memory banks 410 of the second bank group 408b to execute simultaneous read and write operations within the second bank group 408b.

In further examples, in the clock cycle 3, the memory controller 202 performs yet another IF shift by changing the row address of the memory banks 410 of the third bank group 408c and sending the read enable signals to these memory banks 410. Simultaneously, the memory controller 202 can send the write enable signal to at least one of the memory banks 410 of the third bank group 408c to execute simultaneous read and write operations within the third bank group 408c.

Figure 10A:
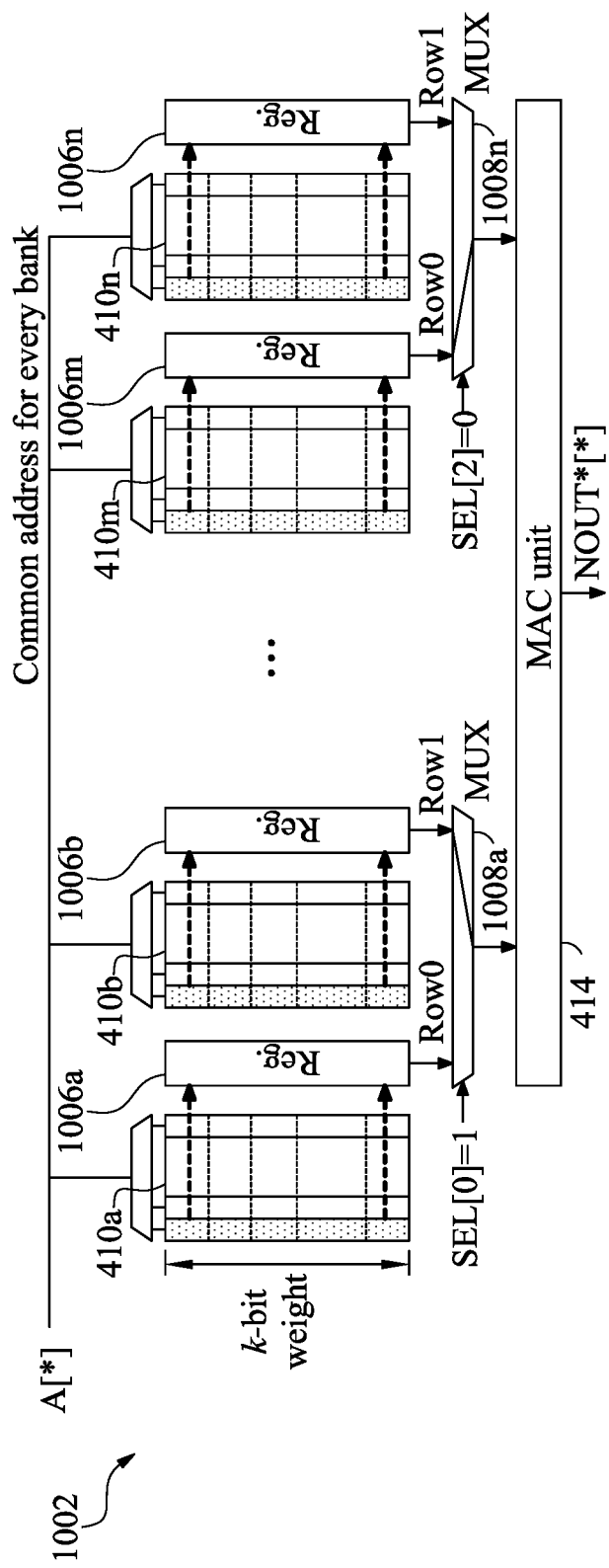
Figure 11:
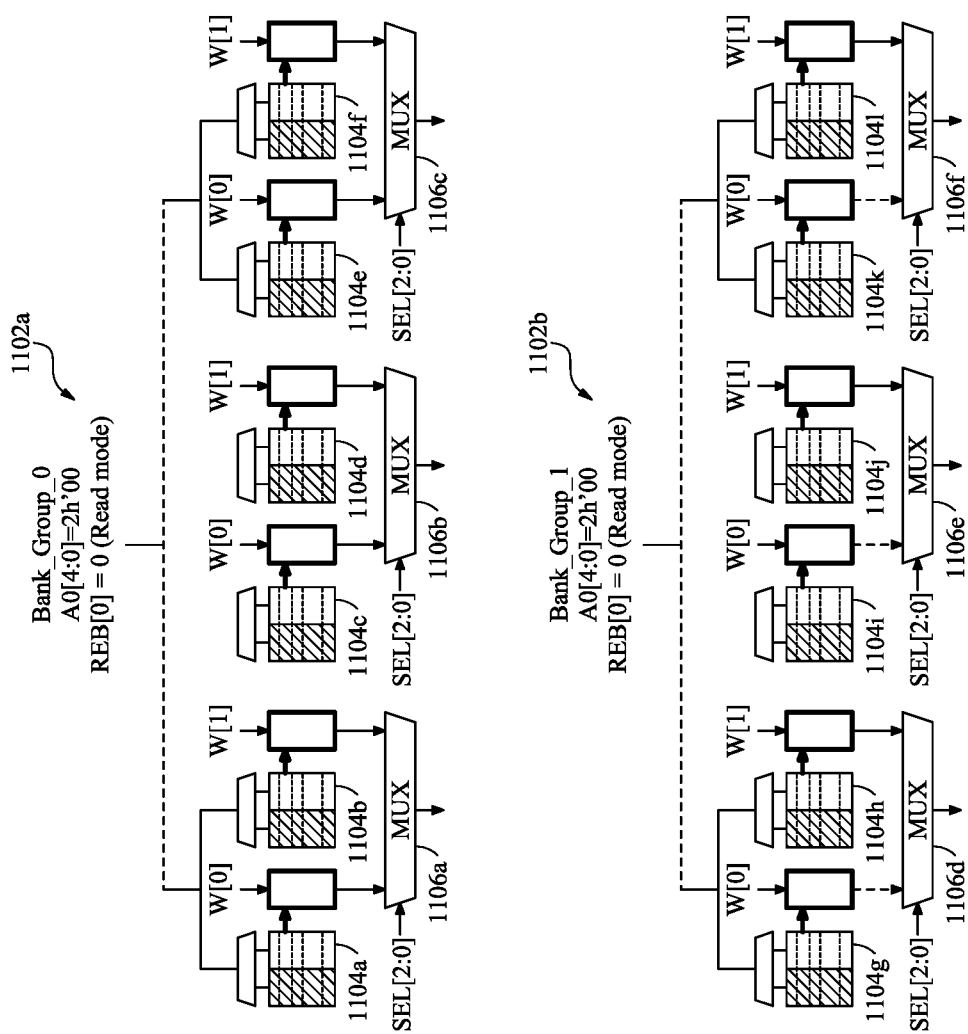

Referring to FIGS. 10A-11, depicted are example structures with flexible bank addressing using at least one additional MUX and select signal (SEL) of the memory system 200 of FIG. 2, in accordance with some embodiments. The features or functionalities for implementing the MUX and SEL for flexible bank addressing can be performed by the one or more components of memory system 200, for example. In some cases, certain operations of FIGS. 10A-11 can be described in conjunction with at least one of FIGS. 3-9C, such as reading data from the memory banks 410, storing the data in the corresponding registers 412 (similar to registers 1006a-n, in this case), or executing the MAC operation using the MAC unit 414, for example.

Figure 12:
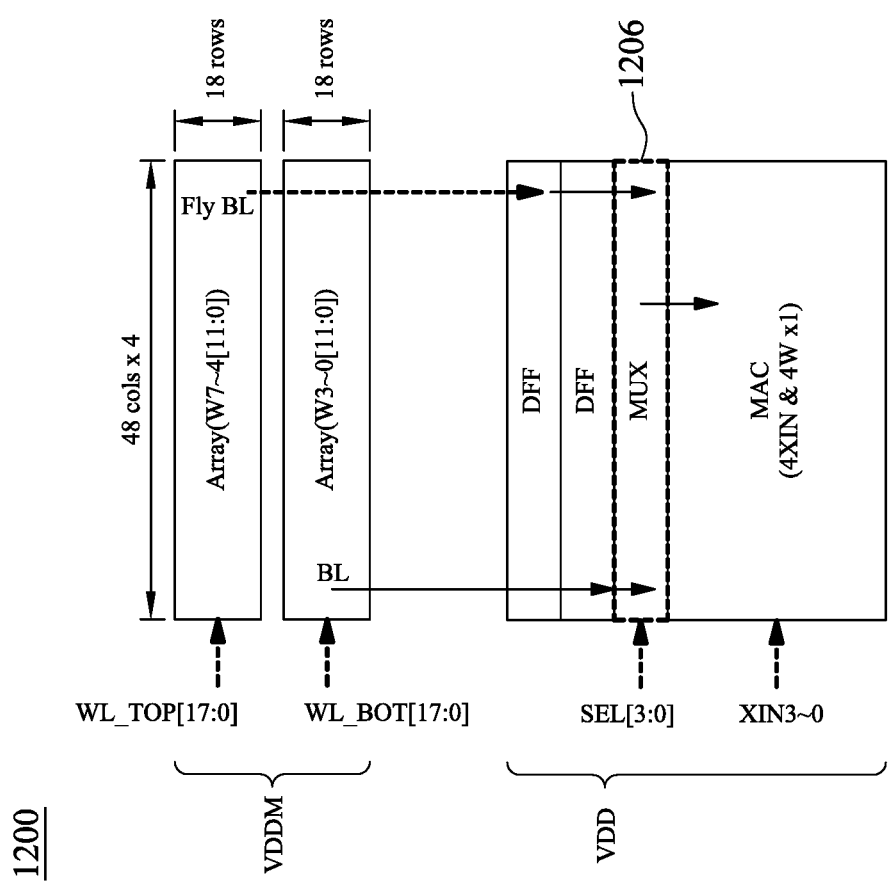
FIG. 12 illustrates an example architecture with flexible bank addressing with at least one additional MUX and SEL of the memory system of FIG. 2, in accordance with some embodiments.
Figure 13A:
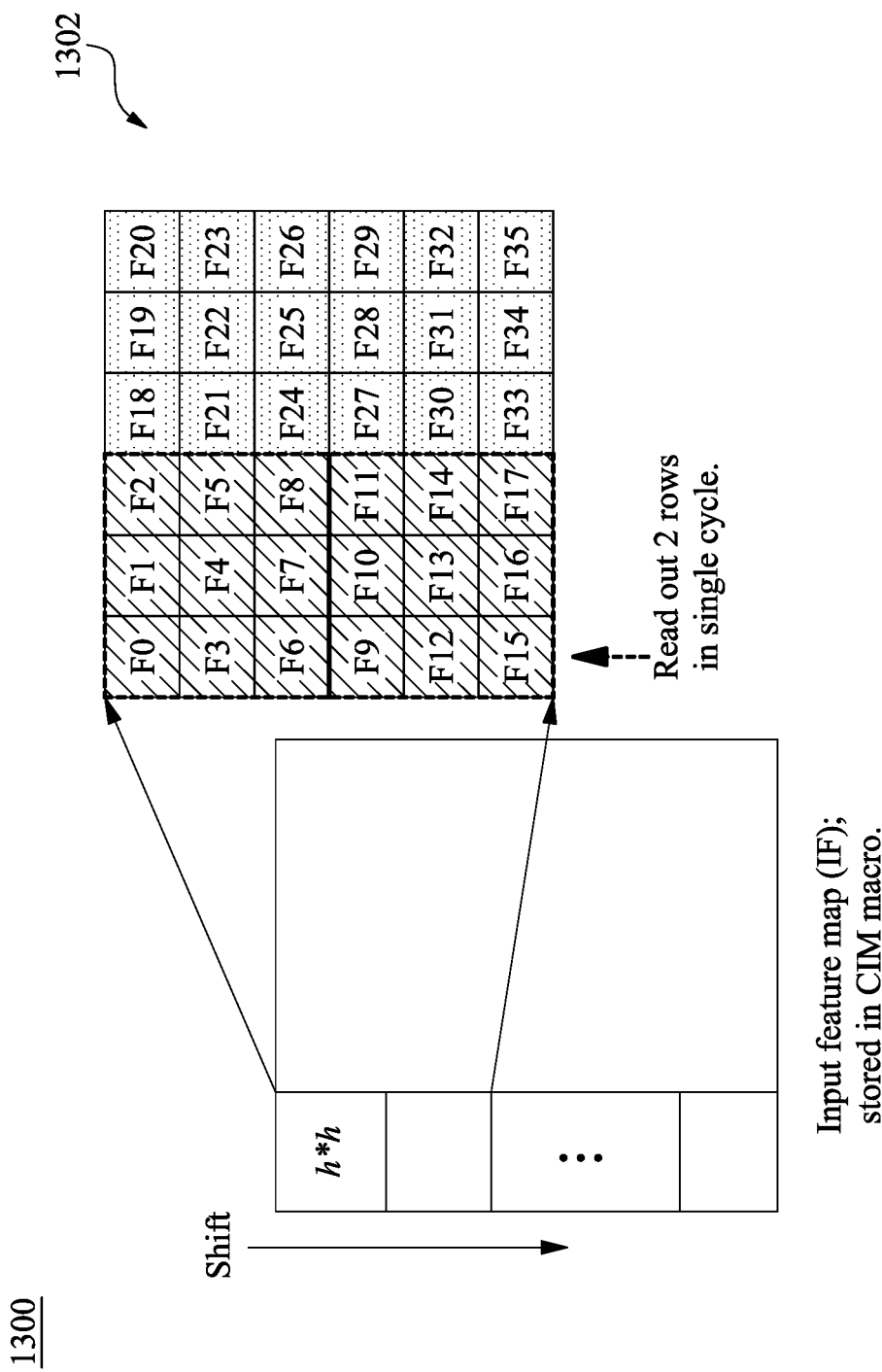
FIGS. 13A-16B illustrate example operations for flexible bank addressing using an array with fly bit line (BL) of the memory system of FIG. 2, in accordance with some embodiments.
Figure 13B:
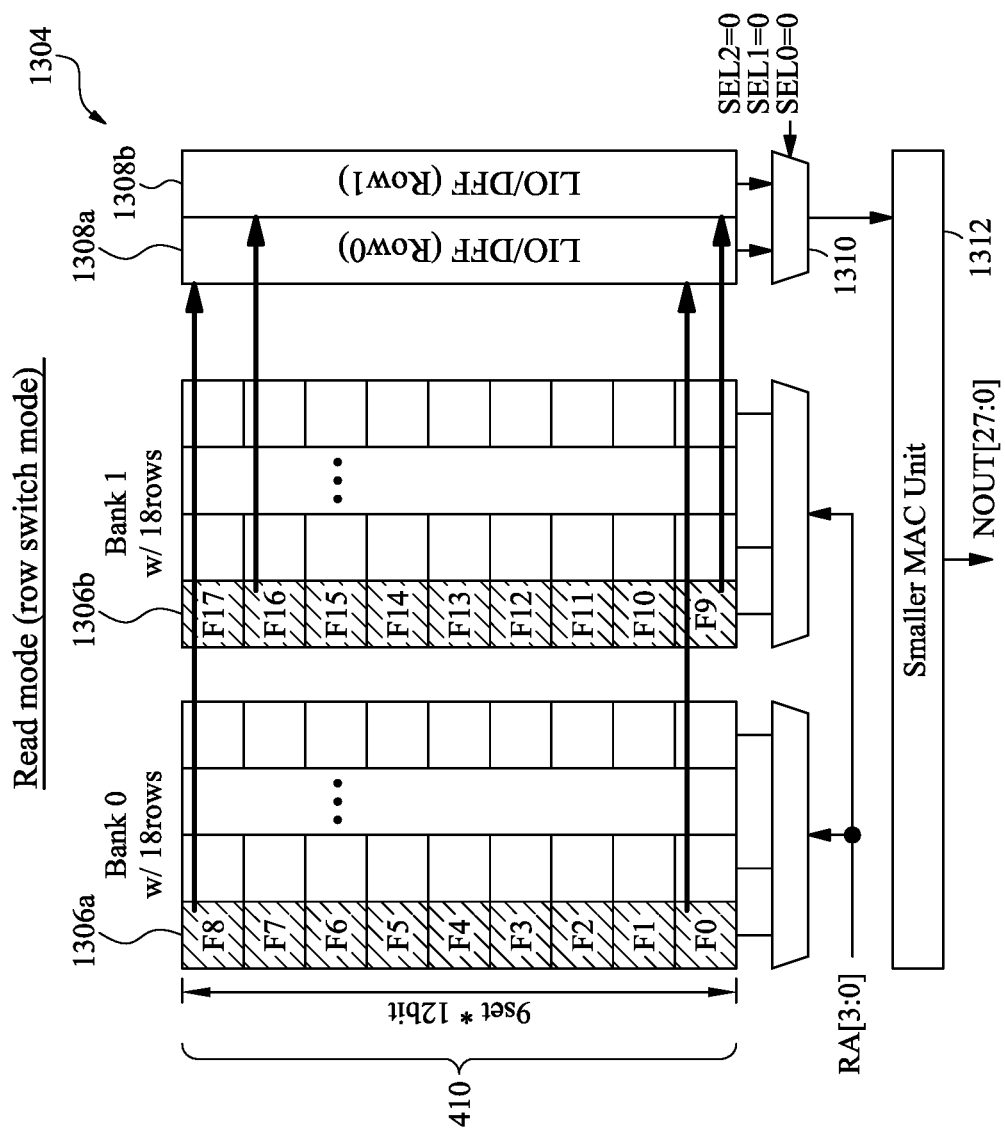
Figure 14A:
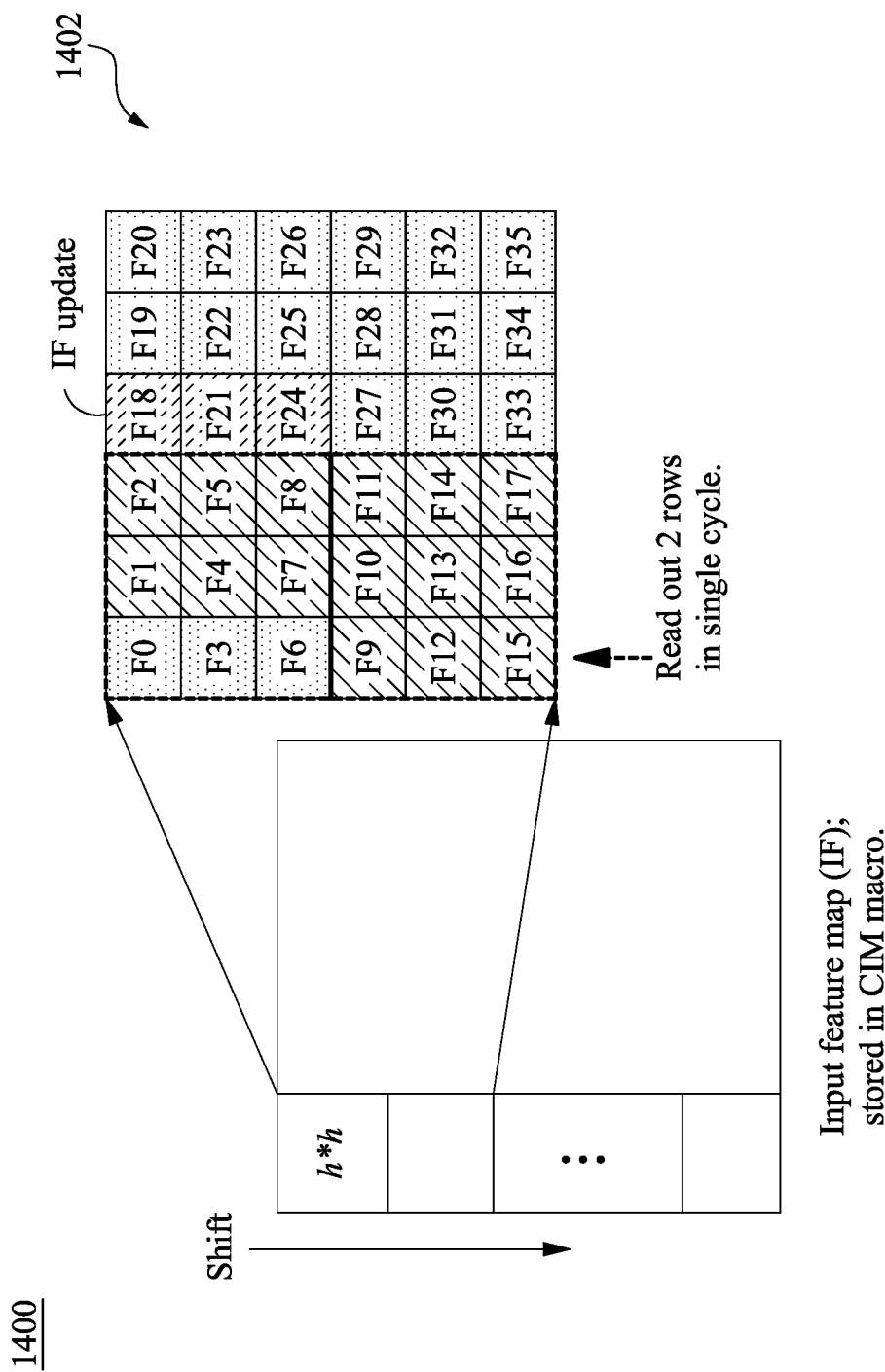
Figure 14B:
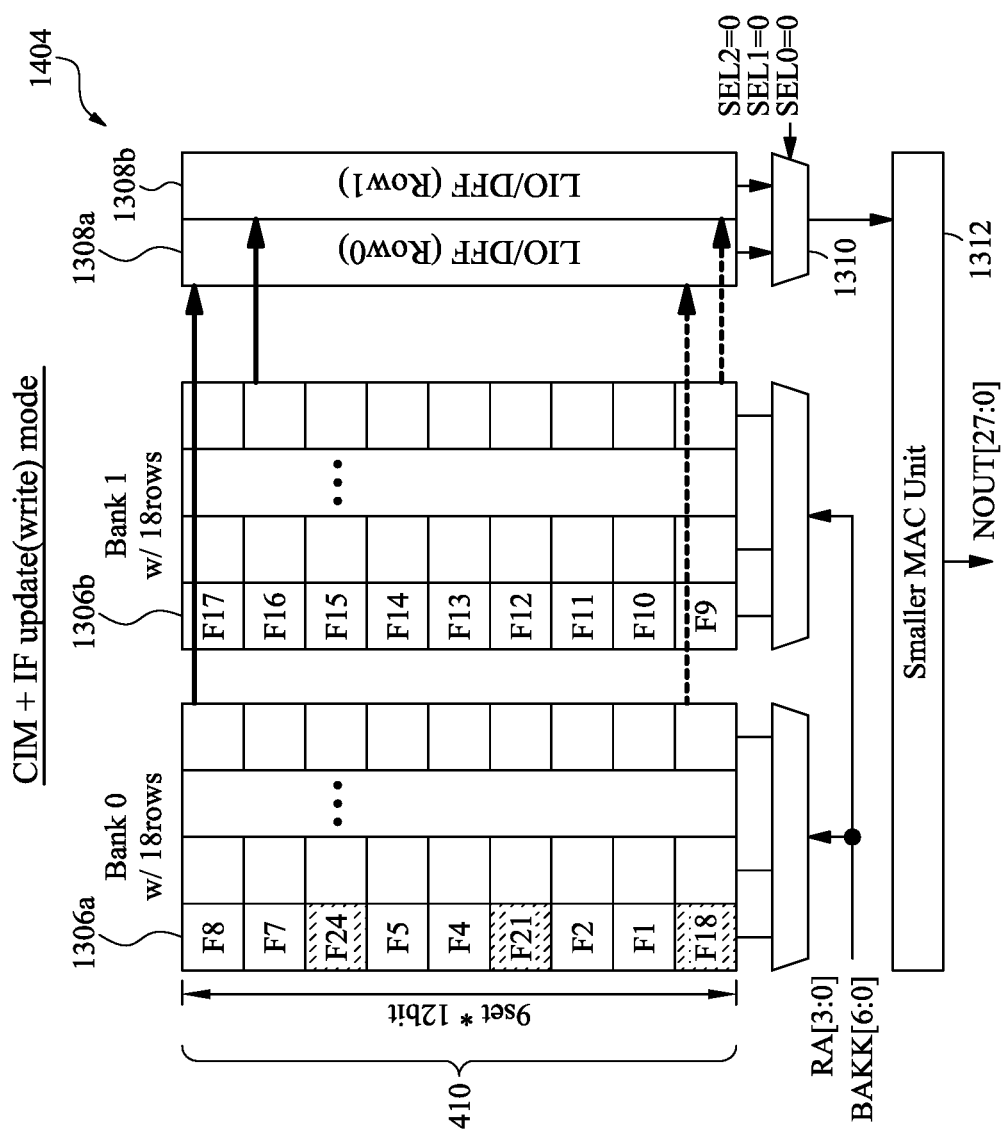
Figure 15A:
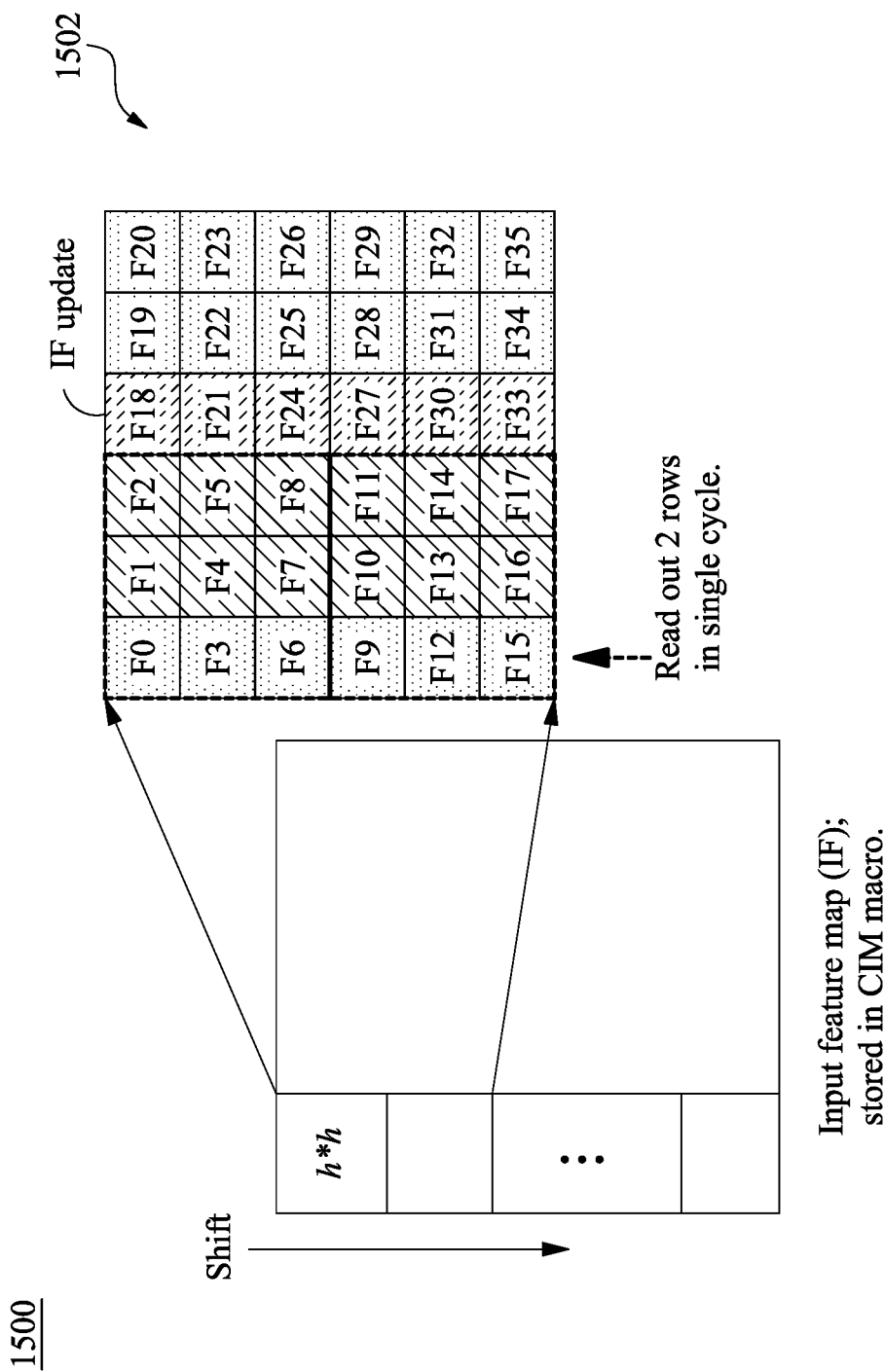
Figure 15B:
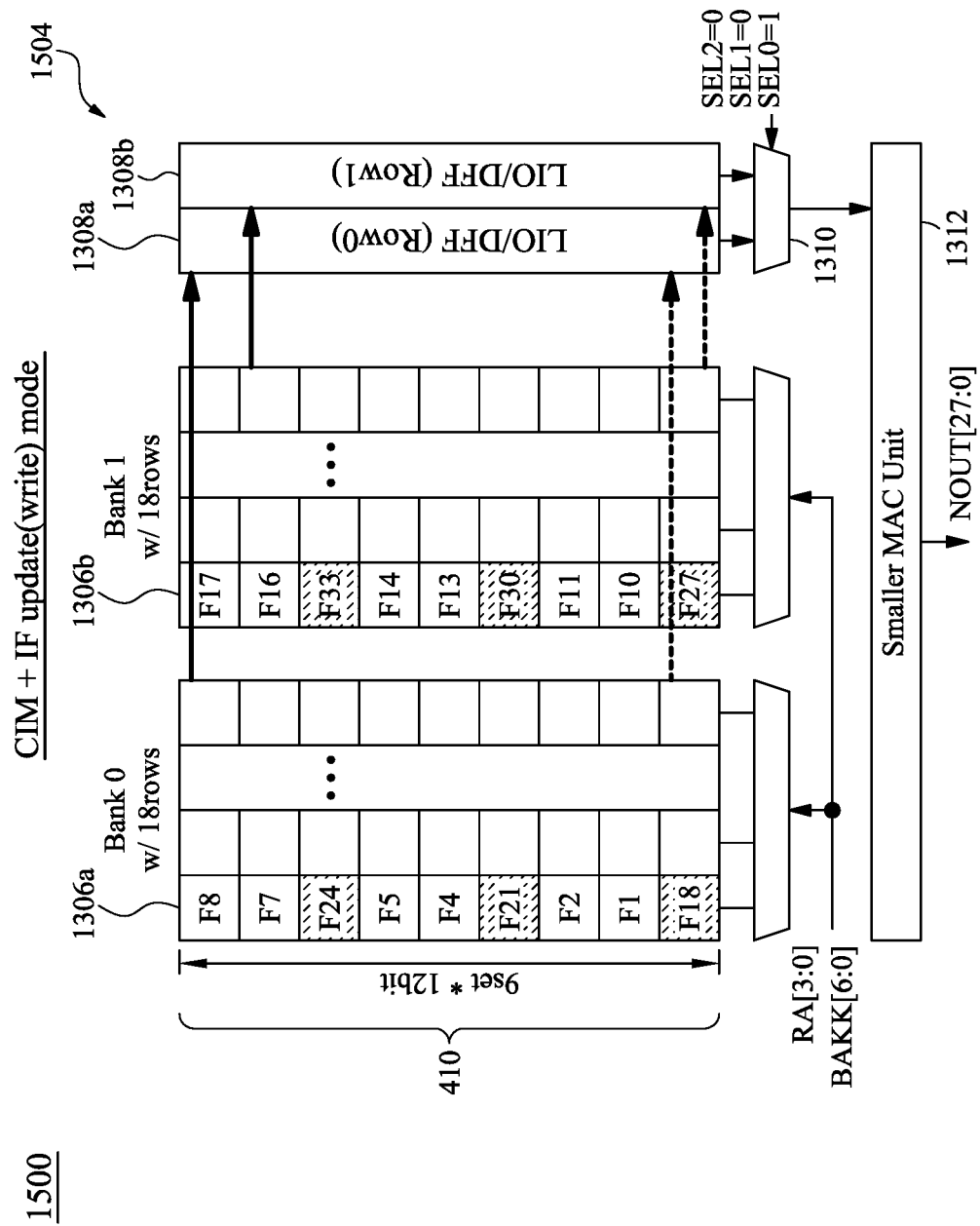
Figure 16A:
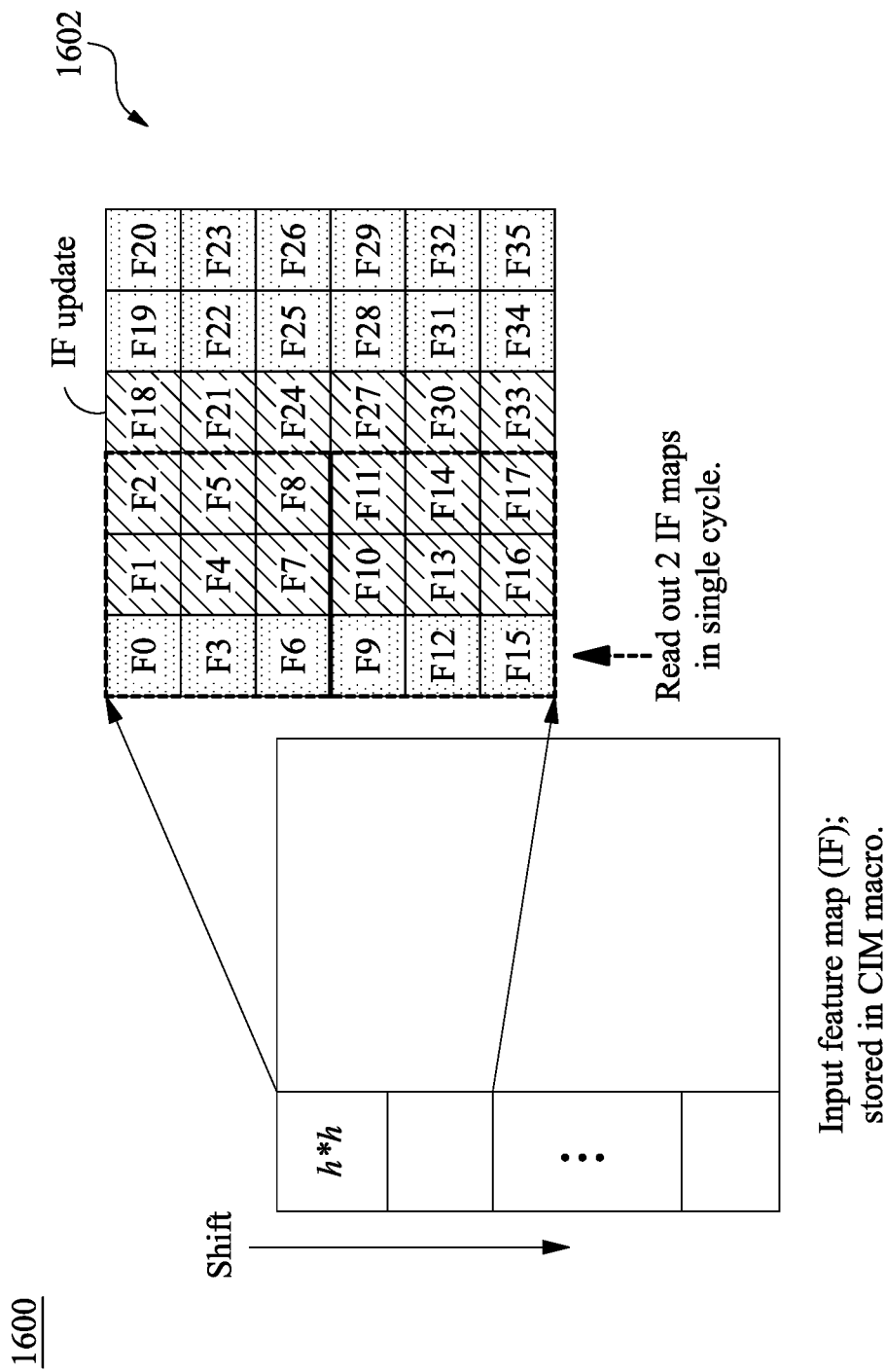
Figure 16B:
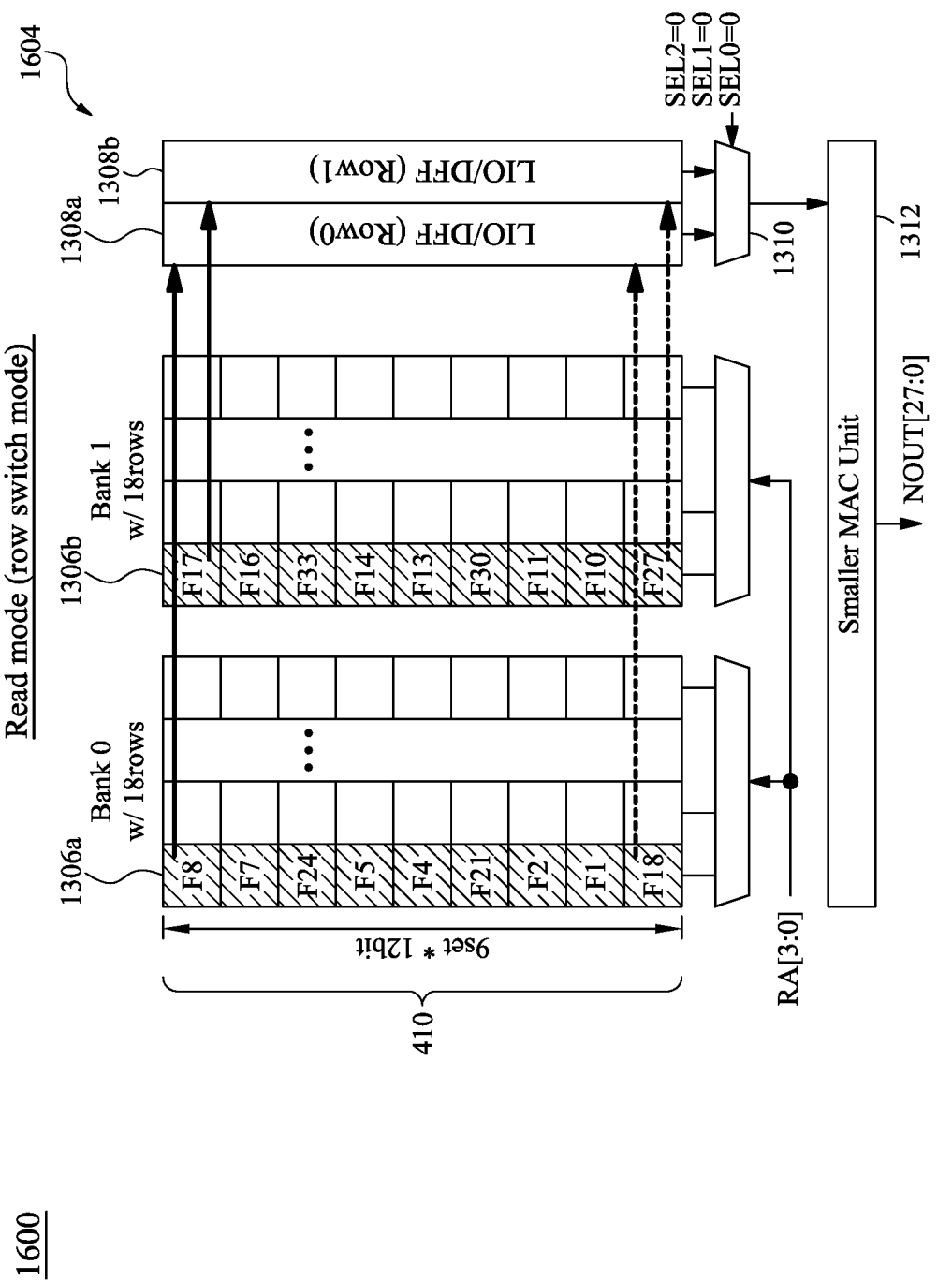

In various configurations, the flexible bank addressing may be implemented using at least one additional MUX 1008 (e.g., at least one of MUX 1008a-n) and SEL after a respective set of local input/output (LIOs) (e.g., including storages), such as described in conjunction with FIG. 12 illustrating the architecture for implementing the additional MUX 1008 and SEL. In this case, the memory controller 202 is configured to send the SEL to the MUX 1008 for selecting the input signal, such as from one of the registers 1006a-n corresponding to row 0 or row 1, etc. FIG. 10A shows the example memory bank structure 1002 implemented with the MUX 1008 for row address selection. The table 1004 of FIG. 10B shows three clock cycles (e.g., of the memory controller 202) to perform the IF shift, such as described in conjunction with but not limited to the IF shift of the operation 100 of FIG. 1. The clock cycles shown in the table 1004 can be performed using the example memory bank structure 1002. As shown in the example memory bank structure 1002, two rows of data (e.g., row 0 and row 1) can be loaded into the DFF (or the corresponding register 1006) in a single clock cycle. For example, the memory banks 410 can share a common address. In this case, each memory bank 410 can load a respective row of data, such as a first memory bank can load the first portion of the IF data corresponding to the first row, a second memory bank can load a second portion of the IF data corresponding to a second row, a third memory bank can load a third portion of the IF data corresponding to a third row, etc. Although four memory banks 410 are shown, more or less memory banks 410 can be configured according to the filter size, row addresses, or bank groups 408, for example.

In some configurations, as shown in table 1004, a filter map size of three can be configured (e.g., similar to example operations 400-700), where the IF data includes nine values, such as F0-F8 in the first clock cycle, F3-F11, in the second clock cycle, F6-F14 in the third clock cycle, etc. In these configurations, for each set of rows (e.g., in this case, row 0 and row 1), a respective pair of memory banks 410 coupled to a MUX 1008 can be configured for loading the respective row of data from the registers 1006 corresponding to the memory banks 410. For instance, MUX 1008a may load the row of data from one of the registers 1006a or 1006b corresponding to memory bank 410a or memory bank 410b, respectively. In another example, MUX 1008n may load the row of data from one of the registers 1006m or 1006n corresponding to memory bank 410m or memory bank 410n, respectively.

For example, referring to FIG. 11, two bank groups 1102a-b (e.g., referred to as bank group(s) 1102) are provided for reading at least a portion of the IF data. Additional bank groups may be provided, such as a third bank group (not shown), to read other portions of the IF data. For the filter map size of three, each of the bank groups 1102 can include six memory banks 410, such as memory banks 1104a-f for the first bank group 1102a and memory banks 1104g-l for the second bank group 1102b. These memory banks 1104a-l may be referred to generally as memory bank(s) 1104. The memory banks 1104 may be described in conjunction with at least memory banks 410 of but not limited to FIGS. 4A-7C, for example. Compared to the memory banks 410 of FIGS. 4A-7C, for example, the first row of memory bank 1104a can correspond to the first row of memory bank 410a, the first row of memory bank 1104b can correspond to the second row of memory bank 410a, the first row of memory bank 1104c can correspond to the first row of memory bank 410b, the first row of memory bank 1104d can correspond to the second row of memory bank 410b, and so on. Hence, within a single clock cycle, and using the common address, the memory banks 1104 can load two rows of data within a single clock cycle (e.g., rows 0 and 1 including IF data F0-F17).

With two rows of data being loaded within a single clock cycle, each pair of memory banks 1104 is coupled to one of the respective MUXs 1106a-f (e.g., referred to as MUX(s) 1106). For instance, memory banks 1104a-b can be coupled to MUX 1106a, memory banks 1104c-d can be coupled to MUX 1106b, and memory banks 1104e-f can be coupled to MUX 1106c. In another example, memory banks 1104g-h can be coupled to MUX 1106d, memory banks 1104i-j can be coupled to MUX 1106e, and memory banks 1104k-l can be coupled to MUX 1106f.

In this configuration, each MUX 1106 can be used to select one of the rows (e.g., row 0 or row 1) for each bank group 1102 based on the SEL. As described in conjunction with FIG. 12, the MUX 1106 with SEL can be positioned after the two DFF controls for row selection. For example, the SEL=0 can indicate a selection of the first row (e.g., row 0) and SEL=1 can indicate a selection of the second row (e.g., row 1) of the respective pair of memory banks 1104. Hence, the common address can be provided to all memory banks 1104 and the MUXs 1106 can be used to select the row of data. In this case, the first clock cycle can be used for memory access to read the data, thereby minimizing the number of cycles to perform CIM and/or write operation, and minimizing the number of address pins.

Referring back to table 1004, in the first clock cycle, the memory controller 202 can access the memory banks 1104 to read out the IF data. The memory controller 202 can access the memory banks 1104, for instance, by sending control signals for the memory banks 1104 to perform the read operations, thereby reading out F0-F17 to their respective register 1006 (e.g., DFF). In this clock cycle, the memory controller 202 can set the SEL for all MUXs 1106 to '0', such that data from row 0 of all bank groups 1102 are provided to the MAC unit 414 (e.g., F0-F8).

In the second clock cycle, the memory controller 202 can send a SEL '1' to MUXs 1106a-c associated with the first bank group 1102a. By changing the SEL, the data from row 1 can be provided to the MAC unit 414 from the memory banks 1104 of the first bank group 1102a (e.g., F9-F11), among the data from other bank groups 1102 (e.g., F3-F8). Similarly, in the third clock cycle, the memory controller 202 can send a SEL '1' to the MUXs 1106d-f associated with the second bank group 1102b. Responsive to changing the SEL, the data from row 1 can be provided to the MAC unit 414 from the memory banks 1104 of the second bank group 1102b (e.g., F12-F14), among the data from other bank groups 1102 (e.g., F6-F11). As such, the bank group architecture can coexist with MUX 1106 with SEL architecture for flexible bank addressing.

FIG. 12 illustrates an example architecture 1200 with flexible bank addressing with the at least one additional MUX and SEL of the memory system 200 of FIG. 2, in accordance with some embodiments. The example architecture 1200 for implementing the MUX 1106 with SEL can be described in conjunction with FIGS. 10A-11. As shown, the MUX with SEL (e.g., MUX 1206) can be implemented after the array outputs (e.g., LIO outputs) and/or the DFFs to support the IF shift. In this configuration, the number of input channels may be reduced, such as by half (e.g., from 72 in_ch to 36 in_ch, etc.). Because of the relatively smaller input/output I/O configuration, the LIO can be configured as a wrapper. Further, relatively smaller adder trees can be prepared.

FIGS. 13A-16B illustrate example operations 1300-1600 for flexible bank addressing using an array with fly bit line (BL) (e.g., for separating BL into two groups, such as to different DFF) of the memory system 200 of FIG. 2, in accordance with some embodiments. FIGS. 13A-16B show arrays 1302, 1402, 1502, 1602, and structures 1304, 1404, 1504, 1604, performing the read and/or write operations for a 3×3 filter size. The example operations 1300-1600 can be performed to read 18 rows of data. The example operations 1300-1600 can be performed by one or more components of the memory system 200, such as by but not limited to the memory controller 202, for example. The features or functionalities of operations 1300-1600 can be described in conjunction with at least one of FIGS. 1-12. The arrays 1302, 1402, 1502, 1602 can be described in conjunction with but not limited to at least one of arrays 102, 402, 502, 602, 702, among other arrays of FIG. 1 or 4A-9C, for example. The structures 1304, 1404, 1504, 1604 provide illustrative examples of read and/or write operations performed in the memory banks 410 of the bank groups 1306a-b, which can be described in conjunction with but not limited to bank groups 408.

At operation 1300, in a first clock cycle, two sets of IF data can be mapped to adjacent bank groups 1306a-b (e.g., referred to as bank group(s) 1306). Each bank group 1306 can include a number of memory banks 410, where the number of memory banks 410 corresponds to the filter size (e.g., filter size 3×3=9 memory banks 410). For example, in this clock cycle, a first set of IF data including F0-F8 can be mapped to the first bank group 1306a, and a second set of IF data including F9-F17 can be mapped to the second bank group 1306b. The memory controller 202 can send control signals for each bank group 1306 to perform the read operation. Responsive to receiving the control signals, the memory banks 410 can read out the data from the corresponding row address. For instance, the memory banks 410 of bank group 1306a can read out F0-F8, and the memory banks 410 of bank group 1306b can read out F9-F17. The read data can be latched in the corresponding DFF at each LIO, such as LIO/DFF 1308a for row 0 data from bank group 1306a and LIO/DFF 1308b for row 1 data from bank group 1306b.

The memory controller 202 can send SEL to the MUX 1310 to select either row 0 or row 1 IF data or values from the LIO/DFF 1308a-b. As shown, three SEL can be configured for the corresponding three groups of IF data in each row address. For example, SEL0 can be used for selecting F0-F2 of row 0 (e.g., SEL0=0) and/or F9-F11 of row 1 (e.g., SEL0=1). SEL1 can be used for selecting F3-F5 of row 0 (e.g., SEL1=0) and/or F12-F14 of row 1 (e.g., SEL1=1). SEL2 can be used for selecting F6-F8 of row 0 (e.g., SEL2=0) and/or F15-F17 of row 1 (e.g., SEL2=1). In the first clock cycle, the F0-F8 data can be loaded to a MAC unit 1312 to perform the MAC operation.

At operation 1400, the memory controller 202 can perform a write operation at a second clock cycle. Because the IF data F0-F17 have already been loaded to the LIO/DFF 1308a-b, the memory controller 202 can initiate a write operation for the one or more memory banks 410. For example, the memory controller 202 can update the address row for one or more memory banks 410, such as using respective MUX, or other components capable of performing similar functions, and queue the data for storage in the corresponding memory banks 410. As shown in array 1402 and structure 1404, the memory controller 202 can initiate the write operations for storing F18, F21, and F24 in the corresponding memory banks 410 of bank group 1306a.

Concurrent with the write operation, the memory controller 202 can set the SEL to select the desired row data (e.g., row 0 IF values or row 1 IF values) for loading to the MAC unit 1312. In this case, F3-F11 may be provided to the MAC unit 1312, by setting SEL0=1, for example. Hence, the memory controller 202 is not required to access the memory banks 410 for reading, and the CIM and write (e.g., IF update) can be supported in the same clock cycle.

Similarly, at operation 1500, the memory controller 202 can perform another write operation at a third clock cycle. Because the IF data F0-F17 have already been loaded to the LIO/DFF 1308a-b, the memory controller 202 can initiate the write operation for the one or more memory banks 410. In this case, the memory controller 202 can initiate the write operation for one or more memory banks 410 of bank group 1306b. As shown in array 1502 and structure 1504, the memory controller 202 can initiate the write operations for storing F27, F30, and F33 in the corresponding memory banks 410 of bank group 1306b. Concurrent with the write operation, the memory controller 202 can set the SEL to select the desired row data for loading to the MAC unit 1312. In this case, F6-F14 may be provided to the MAC unit 1312, by setting SEL1=1, for example. Similar operations for IF shifts can be performed in the fourth clock cycle, such as loading F9-F17 to the MAC unit 1312 for the MAC operation. The various write operations to the CIM storage discussed herein can be (but are not limited to) IF data from external storage, for example.

At operation 1600, in the fifth clock cycle, after completing the MAC operations for the first two rows of data, the memory controller 202 can initiate another read operation for the memory banks 410. As shown in array 1602 and structure 1604, the IF data F18, F21, F24, F27, F30, and F33 have replaced the previous IF data F0, F3, F6, F9, F12, and F15, respectively. In this case, the memory controller 202 can send control signals to the memory banks 410 of the bank groups 1306 to read out two sets of IF data (e.g., mapped to the adjacent bank groups 1306) using the same row address, for example. The two sets of IF data can be read in the same clock cycle, which can include F1, F2, F18, F4, F5, F21, F7, F8, F24, F10, F11, F27, F13, F14, F30, F16, F17, and F33. The read data can be latched to the DFF at each LIO (e.g., DFF/LIO 1308). In some implementations, the one or more operations of operation 1600 can be performed similarly to operation 1300, for example.

Figure 17A:
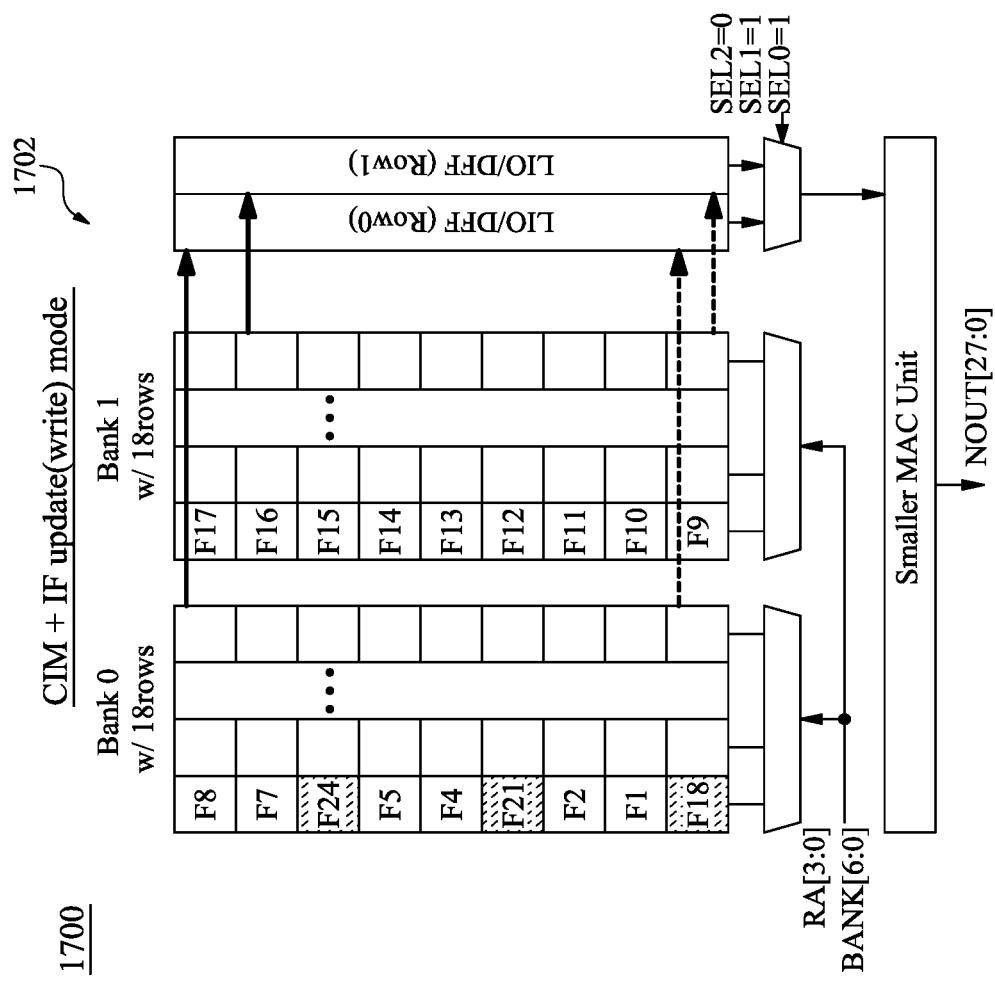
FIGS. 17A-B illustrate an example operation for flexible bank addressing using an array with fly BL with multiport memory of the memory system of FIG. 2, in accordance with some embodiments.
Figure 17B:
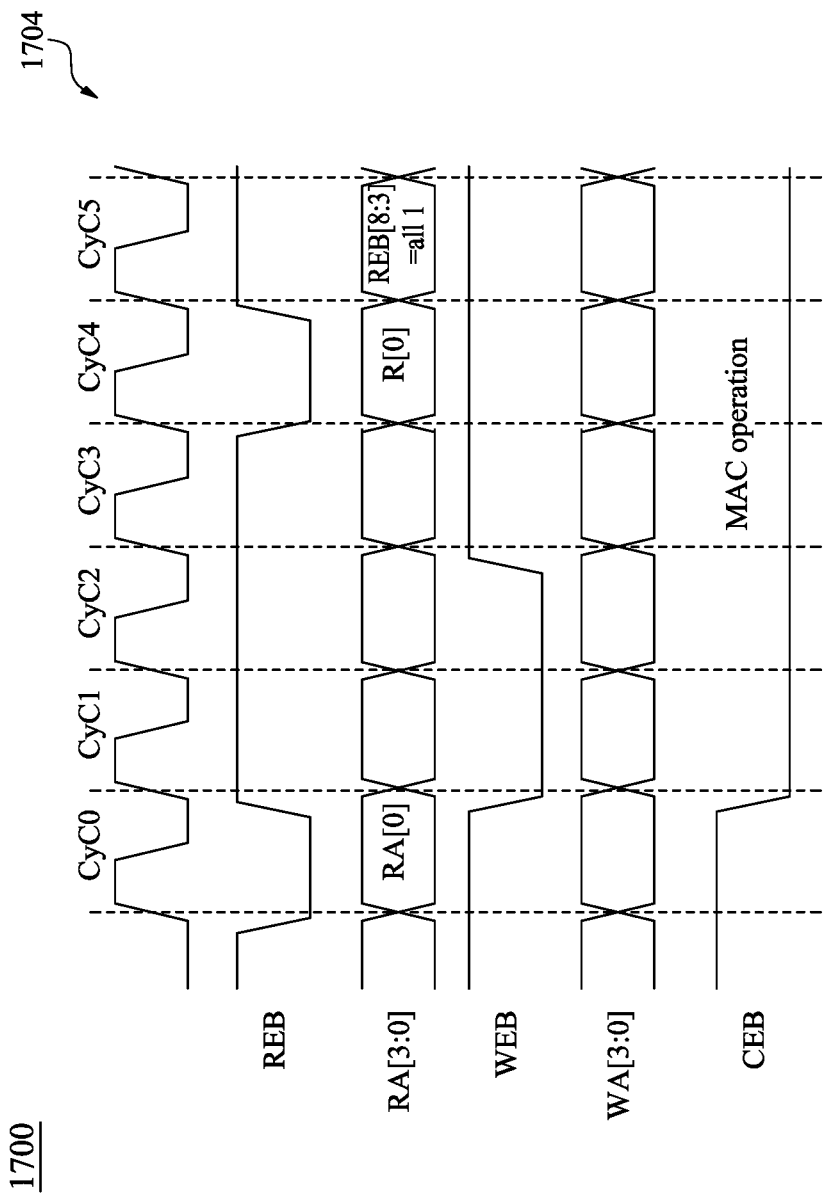

Referring to FIGS. 17A-B, depicted is an example operation 1700 for flexible bank addressing using an array with fly BL with multiport memory of the memory system 200 of FIG. 2, in accordance with some embodiments. The operation 1700 can be performed by one or more components of the memory system 200. In some cases, certain steps of the operation 1700 may be performed similarly or described in conjunction with at least one of operations 1300-1600 of FIGS. 13A-16B, for example. FIGS. 17A-B show an example structure 1702 and timing diagram 1704 for flexible bank addressing using the array with fly BL with multiport memory. The example timing diagram 1704 shows six clock cycles of the memory controller 202 performing the example operation 1700.

Figure 18:
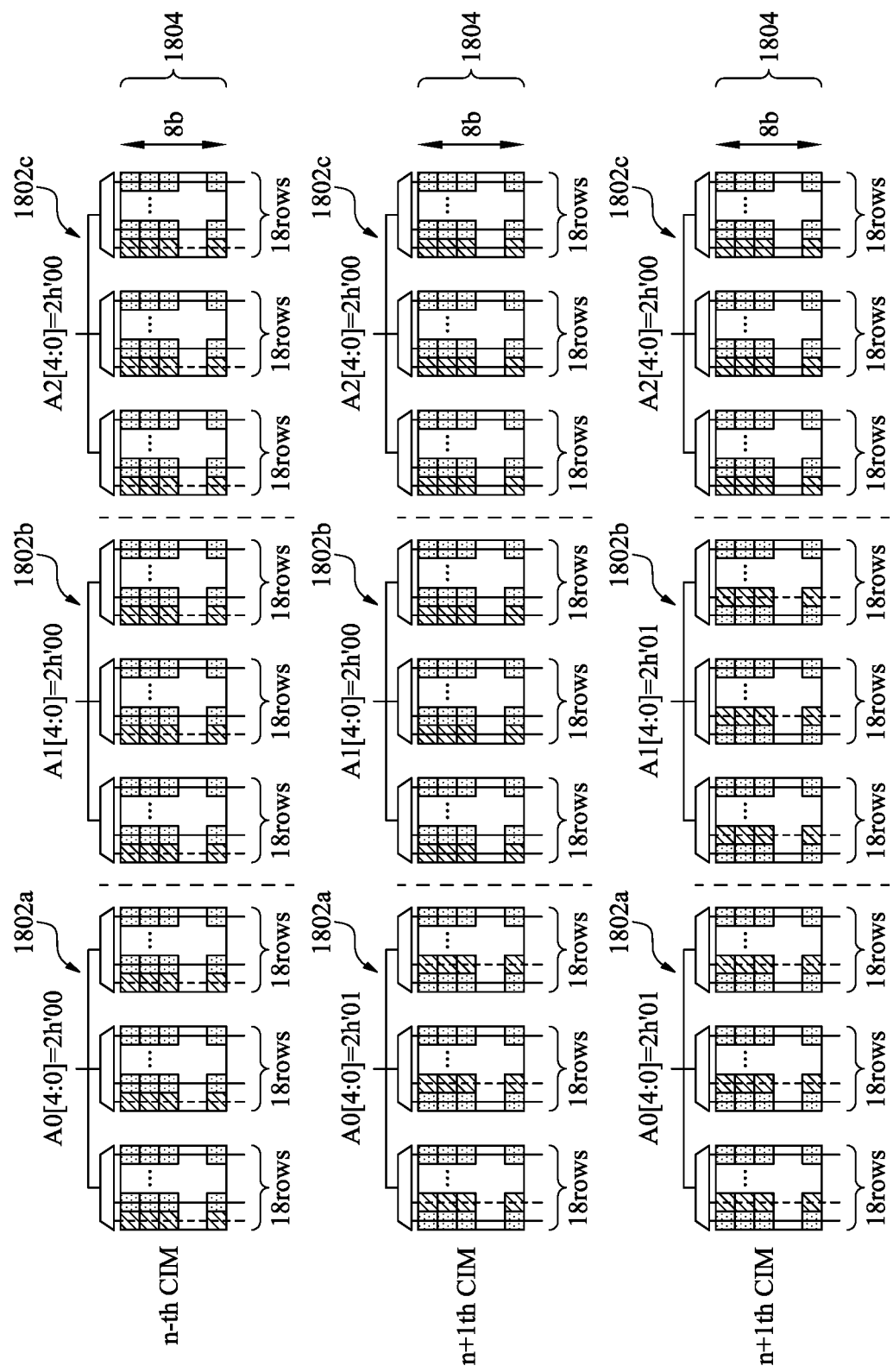
FIG. 18 illustrates an example operation for CIM cycles of the memory system of FIG. 2 supporting a predetermined step size, in accordance with some embodiments.

Referring to FIG. 18, depicted is an example operation 1800 for CIM cycles of the memory system of FIG. 2 supporting a predetermined step size, in accordance with some embodiments. The example operation 1800 can be performed by one or more components of the memory system 200, such as by but not limited to the memory controller 202, for example. The features or functionalities of operation 1800 can be described in conjunction with at least one of FIGS. 1-12. As shown, three bank groups 1802a-c (e.g., referred to as bank group(s) 1802) are provided for reading at least a portion of the IF data. Additional bank groups may be provided, such as a fourth bank group (not shown), to read other portions of the IF data. The bank group 1802 can be similar to at least bank group 408, such as described in conjunction with at least but not limited to FIGS. 4A-9C. Each of the bank groups 1802 can include a number of memory banks 1804, according to the filter map size. For instance, for the filter map size of three, each of the bank groups 1802 can include three memory banks 1804.

Across the bank groups 1802, there may be nine memory banks 1804 configured to perform read or write operations for a 3×3 filter size. The memory banks 1804 can be described in conjunction with memory banks 410, such as described in conjunction with at least but not limited to FIGS. 4A-7C. Further, in the example operation 1800, there are a total of 18 rows (e.g., address rows) configured for the memory banks 1804.

For each clock cycle, the memory banks 1804 can load a respective row of data within the clock cycle. For example, in the $n^{th}$ CIM operation/cycle, the row addresses (e.g., the first, second, and third addresses) for the bank groups 1802 can be set to zero (e.g., A0-2 can be set to zero, shown as 2h'00). In this cycle, the IF data F0-F8 (e.g., shown in at least array 402) can be selected by the row addresses. In the $n^{th}+1$ CIM cycle, the row addresses for bank group 1802a of the bank groups 1802 can be set to one (e.g., A0=2h'01). For instance, the IF data can be shifted by a predetermined number of pixel steps, corresponding to a configured step size. The step size can refer to the number of pixel steps (or IF data shifting) to perform within a single CIM cycle. In this cycle, the IF data may be shifted by a 1-pixel step (e.g., shown in at least array 502), corresponding to a step size of 1, thereby reading IF data F9-F11. In the $n^{th}+2$ CIM cycle, the row addresses for bank group 1802b of the bank groups 1802 can be set to one (e.g., A1=2h'01), when shifting another 1-pixel step (e.g., shown in at least array 602), to read IF data F12-F14. In other CIM cycles, the row addresses for the respective bank group 1802 can be updated accordingly.

In some configurations, the step size can be greater than one. For example, a step size can be configured as 2, such that the IF data may be shifted by a 2-pixel step in each CIM cycle. In this case, the $n^{th}+1$ CIM cycle may be skipped, and the operation corresponding to the $n^{th}+2$ CIM cycle can be performed. As shown, by skipping the $n^{th}+1$ CIM cycle after performing the $n^{th}$ CIM cycle, the row addresses for bank groups 1802a-b of the bank groups 1802 can be set to one (e.g., A0-1=2h'01), when shifting by 2-pixel step (e.g., shown in at least array 602), to read IF data F9-F14 in the next CIM cycle. Other step sizes can be configured by the administrator or the user, for example.

In one aspect of the present disclosure, a method is disclosed. The method includes providing a plurality of bank groups, each of the plurality of bank groups comprising a respective number of memory banks, each memory bank configured to store a corresponding portion of input feature map data. The method includes reading, during a first clock cycle, a first portion of the input feature map data from a first one of the plurality of bank groups and a second portion of the input feature map data from a second one of the plurality of bank groups. The method includes performing a first multiply-accumulate operation using the read first portion of the input feature map data and the read second portion of the input feature map data. The method includes reading, during a second clock cycle, a third portion of the input feature map data from the first bank group. The method includes performing a second multiply-accumulate operation using the read second portion of the input feature map data and the read third portion of the input feature map data.

In another aspect of the present disclosure, a system is disclosed. The system includes a plurality of bank groups, each of the plurality of bank groups comprising a respective number of memory banks, each memory bank configured to store a corresponding portion of input feature map data. The system includes a memory controller. The memory controller is to read, during a first clock cycle, a first portion of the input feature map data from a first one of the plurality of bank groups and a second portion of the input feature map data from a second one of the plurality of bank groups. The memory controller is to perform a first multiply-accumulate operation using the read first portion of the input feature map data and the read second portion of the input feature map data. The memory controller is to read, during a second clock cycle, a third portion of the input feature map data from the first bank group. The memory controller is to perform a second multiply-accumulate operation using the read second portion of the input feature map data and the read third portion of the input feature map data.

In another aspect of the present disclosure, a circuit is disclosed. The circuit includes a plurality of bank groups, each of the plurality of bank groups comprising a respective number of memory banks, each memory bank configured to store a corresponding portion of input feature map data. The circuit includes a memory controller. The memory controller is to read, during a first clock cycle, a first portion of the input feature map data from a first one of the plurality of bank groups and a second portion of the input feature map data from a second one of the plurality of bank groups. The memory controller is to perform a first multiply-accumulate operation using the read first portion of the input feature map data and the read second portion of the input feature map data. The memory controller is to read, during a second clock cycle, a third portion of the input feature map data from the first bank group. The memory controller is to perform a second multiply-accumulate operation using the read second portion of the input feature map data and the read third portion of the input feature map data.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "processing circuit," "data processing apparatus", "data processing system", "computing platform", "computing device", or "device" encompasses all kinds of apparatus, devices, and machines for processing data, including by way of example a programmable processor, integrated circuit (IC), a computer, a system on a chip, or multiple ones, or combinations, of the foregoing. The apparatus can include special purpose logic circuitry, e.g., an FPGA (field programmable gate array) or an ASIC (application-specific integrated circuit). The apparatus may include, in addition to hardware, code that creates an execution environment for the computer program, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). In various implementations, the processes and logic flows described herein can be performed by an IC containing hardware circuit devices or types of logic (e.g., logic components), including FPGAS, ASICs, logic gates, registers, or transistors, electrically or communicatively coupled/connected via various interconnections between the circuit devices.

Processors suitable for the execution of a computer program include, by way of example, both general and special purpose microprocessors, and any one or more processors of any kind of digital computer. Generally, a processor will receive instructions and data from a read-only memory or a random access memory or media. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions, configurations, or processes do not depart from the spirit and scope of the present disclosure, and that they may make various changes, substitutions, and alterations herein without departing from the spirit and scope of the present disclosure.

What is claimed is:

1. A method, comprising:
   providing a plurality of bank groups, each of the plurality of bank groups comprising a respective number of memory banks, each memory bank configured to store a corresponding portion of input feature map data;
   receiving, during a first clock cycle, a first address and a second address to read a first portion of the input feature map data and a second portion of the input feature map data, respectively;
   reading, during the first clock cycle, the first portion of the input feature map data from a first one of the plurality of bank groups and the second portion of the input feature map data from a second one of the plurality of bank groups;
   performing a first multiply-accumulate operation using the read first portion of the input feature map data and the read second portion of the input feature map data;
   reading, during a second clock cycle, a third portion of the input feature map data from the first bank group; and
   performing a second multiply-accumulate operation using the read second portion of the input feature map data and the read third portion of the input feature map data.

2. The method of claim 1, wherein the first portion, the second portion, and the third portion of the input feature map data form contiguous first, second, and third data rows, respectively.

3. The method of claim 1, further comprising:
   during the second clock cycle, receiving a third address updated from the first address to read the third portion of the input feature map data, while the second address remains the same.

4. The method of claim 1, further comprising:
   reading, during the first clock cycle, a fourth portion of the input feature map data from a third one of the plurality of bank groups; and
   performing the first multiply-accumulate operation using the read first portion of the input feature map data, the read second portion of the input feature map data, and the read third portion of the input feature map data.

5. The method of claim 4, wherein during the second clock cycle when reading the third portion of the input feature map data from the first bank group, the second portion of the input feature map data and the fourth portion of the input feature map data remain stored in respective registers coupled to the second bank group and the third bank group, respectively.

6. The method of claim 5, wherein the first portion, the second portion, the third portion, and the fourth portion of the input feature map data form contiguous first, second, third, and fourth data rows, respectively.

7. The method of claim 1, further comprising:
writing, during a third clock cycle, data for at least one memory bank of the first bank group; and
reading, during the third clock cycle, a fifth portion of the input feature map data from the second bank group.

8. The method of claim 1, further comprising:
during the second clock cycle, receiving a third address updated from the first address to read the third portion of the input feature map data, and a fourth address to write data for at least one memory bank of the first bank group; and
writing, during the second clock cycle, the data for the at least one memory bank of the first bank group along with reading the third portion of the input feature map data.

9. A system, comprising:
a plurality of bank groups, each of the plurality of bank groups comprising a respective number of memory banks, each memory bank configured to store a corresponding portion of input feature map data; and
a memory controller to:
receive, during a first clock cycle, a first address and a second address to read a first portion of the input feature map data and a second portion of the input feature map data, respectively;
read, during the first clock cycle, the first portion of the input feature map data from a first one of the plurality of bank groups and the second portion of the input feature map data from a second one of the plurality of bank groups;
perform a first multiply-accumulate operation using the read first portion of the input feature map data and the read second portion of the input feature map data;
read, during a second clock cycle, a third portion of the input feature map data from the first bank group; and
perform a second multiply-accumulate operation using the read second portion of the input feature map data and the read third portion of the input feature map data.

10. The system of claim 9, wherein the first portion, the second portion, and the third portion of the input feature map data form contiguous first, second, and third data rows, respectively.

11. The system of claim 9, wherein the memory controller is to:
during the second clock cycle, receive a third address updated from the first address to read the third portion of the input feature map data, while the second address remains the same.

12. The system of claim 9, wherein the memory controller is to:
read, during the first clock cycle, a fourth portion of the input feature map data from a third one of the plurality of bank groups; and
perform the first multiply-accumulate operation using the read first portion of the input feature map data, the read second portion of the input feature map data, and the read third portion of the input feature map data.

13. The system of claim 12, wherein during the second clock cycle when reading the third portion of the input feature map data from the first bank group, the second portion of the input feature map data and the fourth portion of the input feature map data remain stored in respective registers coupled to the second bank group and the third bank group, respectively.

14. The system of claim 13, wherein the first portion, the second portion, the third portion, and the fourth portion of the input feature map data form contiguous first, second, third, and fourth data rows, respectively.

15. The system of claim 9, wherein the memory controller is to:
write, during a third clock cycle, data for at least one memory bank of the first bank group; and
read, during the third clock cycle, a fifth portion of the input feature map data from the second bank group.

16. The system of claim 9, wherein the memory controller is to:
during the second clock cycle, receive a third address updated from the first address to read the third portion of the input feature map data, and a fourth address to write data for at least one memory bank of the first bank group; and
write, during the second clock cycle, the data for the at least one memory bank of the first bank group along with reading the third portion of the input feature map data.

17. A circuit comprising:
a plurality of bank groups, each of the plurality of bank groups comprising a respective number of memory banks, each memory bank configured to store a corresponding portion of input feature map data; and
a memory controller to:
receive, during a first clock cycle, a first address and a second address to read a first portion of the input feature map data and a second portion of the input feature map data, respectively;
read, during the first clock cycle, the first portion of the input feature map data from a first one of the plurality of bank groups and the second portion of the input feature map data from a second one of the plurality of bank groups;
perform a first multiply-accumulate operation using the read first portion of the input feature map data and the read second portion of the input feature map data;
read, during a second clock cycle, a third portion of the input feature map data from the first bank group; and
perform a second multiply-accumulate operation using the read second portion of the input feature map data and the read third portion of the input feature map data.

18. The circuit of claim 17, wherein the first portion, the second portion, and the third portion of the input feature map data form contiguous first, second, and third data rows, respectively.

19. The circuit of claim 17, wherein the memory controller is to:
during the second clock cycle, receive a third address updated from the first address to read the third portion of the input feature map data, while the second address remains the same.

20. The circuit of claim 17, wherein the memory controller is to:
during the second clock cycle, receive a third address updated from the first address to read the third portion of the input feature map data, and a fourth address to write data for at least one memory bank of the first bank group; and write, during the second clock cycle, the data for the at least one memory bank of the first bank group along with reading the third portion of the input feature map data.

* * * * *